(12) United States Patent
Wong et al.

(10) Patent No.: US 12,303,948 B2
(45) Date of Patent: May 20, 2025

(54) SYSTEMS AND METHODS FOR CLEANING FOOD PRODUCT FORMING AND DISPENSING DEVICES

(71) Applicant: FBD PARTNERHSIP, LP, San Antonio, TX (US)

(72) Inventors: Elgin W Wong, San Antonio, TX (US); Mathew G Gates, New Braunfels, TX (US); William R Blessing, Jr., Manitou Springs, CO (US); Noah G Trent, San Antonio, TX (US); Carlos A Acosta, San Antonio, TX (US)

(73) Assignee: FBD Partnership, L.P., San Antonio, TX (US)

( * ) Notice: Subject to any disclaimer, the term of this patent is extended or adjusted under 35 U.S.C. 154(b) by 60 days.

(21) Appl. No.: 18/157,954

(22) Filed: Jan. 23, 2023

(65) Prior Publication Data

US 2023/0149984 A1 May 18, 2023

Related U.S. Application Data

(63) Continuation of application No. 16/124,701, filed on Sep. 7, 2018.

(60) Provisional application No. 62/555,117, filed on Sep. 7, 2017.

(51) Int. Cl.
| | |
|---|---|
| *B08B 9/032* | (2006.01) |
| *B08B 3/10* | (2006.01) |
| *B67D 1/07* | (2006.01) |
| *A23G 9/00* | (2006.01) |
| *A23G 9/28* | (2006.01) |
| *A23G 9/30* | (2006.01) |

(52) U.S. Cl.
CPC ............ *B08B 9/0325* (2013.01); *B08B 3/102* (2013.01); *B08B 9/0321* (2013.01); *B08B 9/0328* (2013.01); *B67D 1/07* (2013.01); *A23G 9/00* (2013.01); *A23G 9/28* (2013.01); *A23G 9/30* (2013.01); *B08B 2203/007* (2013.01); *B67D 2001/075* (2013.01)

(58) Field of Classification Search
CPC  B08B 9/02; B08B 9/027; B08B 9/032; B08B 9/0325; B08B 9/0326; B08B 9/0328; B08B 9/08; B08B 9/813; B08B 9/093; A23G 9/30; A47J 31/60; B67D 1/07; B67D 2001/075
See application file for complete search history.

(56) References Cited

U.S. PATENT DOCUMENTS

| | | | |
|---|---|---|---|
| 2,236,620 A | 4/1941 | Cornelius |
| 2,276,811 A | 3/1942 | Ward |
| 2,562,638 A | 7/1951 | Philipp |
| 2,610,478 A | 9/1952 | Lofstedt |
| 2,735,276 A | 2/1956 | Thompson |
| 3,030,976 A | 4/1962 | Brown |
| 3,280,459 A | 10/1966 | Walker |
| 3,441,034 A | 4/1969 | Burks |

(Continued)

*Primary Examiner* — Marc Lorenzi
(74) *Attorney, Agent, or Firm* — McAughan Deaver PLLC

(57) ABSTRACT

The present disclosure provides systems and methods for automating the cleaning and sanitizing processes of a food dispensing machine. The systems and methods may be set to run automatically and may keep a dispensing system cleaned and sanitized for an extended time. The systems and methods disclosed are designed to make cleaning easier for the operator, shorten the overall cleaning time, reduce the amount of labor involved, and improve the convenience, reliability, and repeatability of the cleaning processes.

6 Claims, 28 Drawing Sheets

(56) References Cited

U.S. PATENT DOCUMENTS

| | | |
|---|---|---|
| 3,460,717 A | 8/1969 | Thomas |
| 3,468,137 A | 9/1969 | Frank |
| 3,517,524 A | 6/1970 | Amin |
| 3,661,303 A | 5/1972 | Prosenbauer |
| 3,677,272 A | 7/1972 | Shrank |
| 3,724,235 A | 4/1973 | Carpigiani |
| 3,945,614 A | 3/1976 | Suzuki |
| 4,213,795 A | 7/1980 | Ernstsson |
| 4,590,970 A | 5/1986 | Mott |
| 4,736,600 A | 4/1988 | Brown |
| 4,754,609 A | 7/1988 | Black |
| 4,784,697 A | 11/1988 | Bordini |
| 5,209,076 A | 5/1993 | Kauffman |
| 5,270,013 A | 12/1993 | Decker |
| 5,329,950 A | 7/1994 | Barinas |
| 5,388,925 A | 2/1995 | Wilcox |
| 5,410,888 A | 5/1995 | Kaiser |
| 5,415,326 A | 5/1995 | Durham |
| 5,553,756 A | 9/1996 | Topper |
| 5,632,411 A | 5/1997 | Harty |
| 5,706,661 A | 1/1998 | Frank |
| 5,740,844 A | 4/1998 | Miller |
| 5,743,097 A | 4/1998 | Frank |
| 5,799,726 A | 9/1998 | Frank |
| 5,806,550 A | 9/1998 | Frank |
| 5,899,077 A | 5/1999 | Wright |
| 5,974,824 A | 11/1999 | Galockin |
| 6,056,829 A | 5/2000 | Versteijnen |
| 6,161,558 A | 12/2000 | Franks |
| 6,189,745 B1 | 2/2001 | Frank |
| 6,223,948 B1 | 5/2001 | Davis |
| 6,446,659 B2 | 9/2002 | Schroeder |
| 6,513,578 B2 | 2/2003 | Frank |
| 6,536,224 B2 | 3/2003 | Frank |
| 6,625,993 B2 | 9/2003 | Frank |
| 6,637,214 B1 | 10/2003 | Leitzke |
| 6,877,635 B2 | 4/2005 | Stratton |
| 7,562,793 B2 | 7/2009 | Ufheil |
| 8,079,230 B2 | 12/2011 | Frank |
| 8,528,786 B2 | 9/2013 | Gates |
| 8,701,939 B2 | 4/2014 | Frank |
| 8,960,500 B2 | 2/2015 | Van Opstal |
| 9,173,521 B2 | 11/2015 | Gates |
| 9,388,033 B2 | 7/2016 | Gates |
| 9,457,386 B2 | 10/2016 | Gates |
| 10,034,488 B2 | 7/2018 | Graczyk |
| 10,321,699 B2 | 6/2019 | Gates |
| 10,327,455 B2 | 6/2019 | Gates |
| 2002/0033021 A1 | 3/2002 | Frank |
| 2002/0043071 A1 | 4/2002 | Frank |
| 2003/0037553 A1 | 2/2003 | Sulc |
| 2003/0126871 A1 | 7/2003 | Frank |
| 2004/0118291 A1 | 6/2004 | Carhuff et al. |
| 2004/0124548 A1 | 7/2004 | Rona |
| 2006/0186137 A1 | 8/2006 | Till |
| 2006/0277932 A1 | 12/2006 | Otake |
| 2007/0017234 A1 | 1/2007 | Moulder |
| 2007/0062212 A1 | 3/2007 | Frank |
| 2007/0125104 A1 | 6/2007 | Ehlers |
| 2008/0006050 A1 | 1/2008 | Gist |
| 2008/0041876 A1 | 2/2008 | Frank |
| 2008/0073609 A1 | 3/2008 | Akkermann |
| 2008/0202130 A1 | 8/2008 | Kadyk |
| 2008/0203113 A1 | 8/2008 | Groh |
| 2008/0254180 A1 | 10/2008 | Windhab |
| 2008/0289357 A1 | 11/2008 | Skobel |
| 2008/0302824 A1 | 12/2008 | Blomme |
| 2009/0000315 A1 | 1/2009 | Billman |
| 2009/0014464 A1 | 1/2009 | Adbelmoteleb |
| 2009/0151377 A1 | 6/2009 | Yonemori |
| 2009/0211269 A1 | 8/2009 | Gist |
| 2009/0292395 A1 | 11/2009 | DiFatta |
| 2010/0024844 A1 | 2/2010 | Brunswick et al. |
| 2010/0044395 A1 | 2/2010 | Webb |
| 2010/0293965 A1 | 11/2010 | Frank |
| 2010/0319389 A1 | 12/2010 | Yang et al. |
| 2011/0042414 A1 | 2/2011 | Tachibana |
| 2011/0049190 A1 | 3/2011 | Sevcik |
| 2011/0192423 A1 | 8/2011 | Boussemart |
| 2012/0181287 A1 | 7/2012 | Holbeche |
| 2012/0186202 A1 | 7/2012 | Pandurangan |
| 2013/0086930 A1 | 4/2013 | Scherer |
| 2013/0140328 A1 | 6/2013 | Gates |
| 2013/0180594 A1 | 7/2013 | Schneider |
| 2013/0200103 A1 | 8/2013 | Gates |
| 2014/0061345 A1 | 3/2014 | Machovina |
| 2014/0209635 A1 | 7/2014 | Gates |
| 2016/0229675 A1 | 8/2016 | Popov |
| 2016/0245564 A1 | 8/2016 | Frank et al. |
| 2016/0245573 A1 | 8/2016 | Frank |
| 2017/0027185 A1 | 2/2017 | Acosta |
| 2017/0027188 A1 | 2/2017 | Raybin |
| 2017/0030467 A1 | 2/2017 | Versteeg |
| 2017/0064977 A1 | 3/2017 | Bischel |
| 2017/0120311 A1 | 5/2017 | Timmons et al. |
| 2017/0225936 A1 | 8/2017 | Jersey |
| 2017/0347682 A1 | 12/2017 | Dong |
| 2018/0103656 A1 | 4/2018 | Acosta |
| 2018/0106515 A1 | 4/2018 | Cobabe |

Daily Clean

| Cleaning Recipe | | | Control Valves | | | | | | | | | | | Instrumentation | | | Equipment | | |
|---|---|---|---|---|---|---|---|---|---|---|---|---|---|---|---|---|---|---|---|
| Process: | Purpose: | Time (min) | YV-1 | YV-2 | YV-3 | YV-4 | YV-5 | YV-6 | YV-7 | YV-8 | YV-9 | YV-10 | YV-11 | LT-1 | PT-1 | TT-1 | P-1 | M-1 | HX-1 |
| 1 Fill | Fill system with water | 0.5 | X | | | X | | A | X | X | | | | X | | | | | |
| 2 Agitate | Agitate barrel | 5 | | X | | | | | | | | | | | | | | X | |
| 3 Rinse | Rinse remaining product to drain | 0.5 | X | | X | X | A | A | X | X | | | | | X | | X | X | |
| 4 Fill | Fill system with water | 0.5 | X | | | X | | A | X | X | | | | X | | | | | |
| 5 Agitate | Agitate barrel | 5 | | | | | | | | | | | | | | | | X | |
| 6 Rinse | Rinse remaining product to drain | 0.5 | X | | X | X | A | A | X | X | | | | | X | | X | X | |
| 7 Fill | Fill system with water | 0.5 | X | | | X | | A | X | X | | | | X | | | | | |
| 8 Agitate | Agitate barrel | 5 | | | | | | | | | | | | | | | | X | |
| 9 Rinse | Rinse remaining product to drain | 0.5 | X | | X | X | A | A | X | X | | | | | X | | X | X | |
| 10 Fill | Fill system with water | 0.5 | X | | | X | | A | X | X | | | | X | | | | | |
| 11 Pre_Drain | Drain solution until hopper empty (time dependent) | 0.5 | X | | X | X | A | A | X | | | | | | X | | X | | |
| 12 D_Fill | Bypass flow into the detergent container | 1 | X | | | X | | A | X | | | X | | | X | | X | | |
| 13 Recirculation 1 | Heat water to 140F and clean detergent | 15 | X | | X | X | A | A | X | X | | | | | X | X | X | X | X |
| 14 Drain | Drain the entire system | 0.5 | X | | X | X | A | | | | | | | | X | | X | X | X |

Key: X = Instrument or equipment active  Total Cleaning Time: 35.5 Minutes
A = Alternate open valve configuration (continuous)  When to use: Daily clean then hold for next use

FIG. 2

SYSTEMS AND METHODS FOR CLEANING FOOD PRODUCT FORMING AND DISPENSING DEVICES

CROSS REFERENCE TO RELATED APPLICATIONS

This application is a continuing application of U.S. patent application Ser. No. 16/124,701, filed on Sep. 7, 2018, which application claims priority to and benefit of U.S. Patent Application Ser. No. 62/555,117, filed on Sep. 7, 2017, entire contents of each of which are incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure relates generally to machines for dispensing food products such as frozen and unfrozen beverages and dessert machines; and more specifically relates to methods and systems for cleaning these machines.

Description of the Related Art

Dispensing machines that provide a food product such as a beverage or dessert from a product chamber via a dispensing valve are well known. For example, frozen carbonated beverage machines produce a frozen beverage by freezing a mixture of ingredients such as syrup, water and carbon dioxide in a mixing and freezing chamber. The freezing chamber is typically surrounded by a coil that contains refrigerant to cause freezing of the mixture inside to a desired level of consistency. The mixture is removed from the inner surface and mixed by a rotating shaft driving one or more scraping/mixing members attached to the shaft. The frozen mixture consistency is controlled by any of a number of methods that turns on the refrigeration to freeze and turns off the refrigeration when the mixture reaches a desired consistency. In a similar way, a confection from dairy or yogurt products may be frozen in a barrel to be mixed and pushed towards a dispensing opening by an auger. When a consumer desires a product, it may then be dispensed through a dispensing valve, which may be controlled automatically or manually.

Further descriptions of frozen beverage machines are provided in U.S. Pat. Nos. 5,706,661, 5,743,097, 5,799,726, 5,806,550, 6,536,224, 6,625,993, 8,079,230, 8,701,939, all by J. I. Frank, et.al., U.S. Pat. Nos. 8,528,786, 9,016,523, and 9,383,033 by M. Gates, U.S. Pat. No. 8,875,732 by C. Cloud, and in U.S. Patent Application Publications 20160229675, by Igor V. Popov, et.al., 20160245573, by J. I. Frank, et.al., and 20080041876 by J. I. Frank, et. al. The entire disclosures of these patents and applications are incorporated herein by reference.

Properly cleaning a food or beverage dispensing machine can be an involved and time-consuming process. Many dispensers must be opened so that a worker may reach inside components to clean and sanitize interior surfaces and assemblies. In some cases, some components are removed from dispensers to be cleaned and sanitized separately, and must be properly reinstalled before the dispenser may be placed back into operation. Removing these pieces prior to cleaning, and replacing them after cleaning requires significant time and care so the dispenser is clean and working properly.

Beverage dispensers, like other apparatuses that contact food, usually adhere to standards from regulatory bodies. These standards are frequently intended for use by certifying organizations, utilities, regulatory agencies, and/or manufacturers as a basis of providing assurances that adequate health protection exists for covered products. In many cases, the manufacturers of products that contact food will provide documentation detailing how their products should be cleaned to adhere to any appropriate standards.

Typically, a strict protocol of cleaning that adheres to a standard must be followed to ensure that a dispenser runs properly and does not retain any unwanted contaminants. However, the rigors of following such a protocol may make workers reluctant to clean the dispenser.

The time-consuming nature of properly cleaning and sanitizing dispensers has also been known to have an impact on the businesses running them. Some dispensers take several hours each day to clean properly. If this is done during normal operating hours, customers will not be able to obtain a desired product while the dispenser is being cleaned. Alternatively, if the cleaning process is done while the place of business is otherwise closed, workers must be paid for the time they spend cleaning without any revenue coming into the business.

Further descriptions of cleaning frozen beverage machines are provided in U.S. Pat. Nos. 9,173,521 and 9,457,386 by M. Gates, et.al. The entire disclosures of these patents are incorporated herein by reference.

The inventions and subject matter disclosed and taught herein are directed to that which overcomes, or at least minimizes, some of the shortcomings of the prior art.

BRIEF SUMMARY OF THE INVENTION

As one of many possible brief, yet non-limiting, summary of the nature and substance of the inventions claimed herein, the present disclosure provides improved systems and methods that include cleaning a food or beverage dispensing machine with little to no disassembly, and may hold it clean until it is readied for service.

Another brief, yet non-limiting, summary describes a system for cleaning at least one food dispenser, comprising at least one water inlet; at least one fluid outlet in communication with at least one fluid inlet; a fluid heater disposed between the at least one fluid inlet and the at least one fluid outlet; a pump disposed between and in fluid communication with the at least one fluid inlet and the at least one fluid outlet; a cleaning product inlet configured to controllably supply a cleaning product to fluid between the at least one fluid inlet and the at least one fluid outlet; a discharge outlet configured to controllably drain fluid from the at least one food dispenser; a first hose configured to connect to the at least one fluid outlet and to removably connect to the at least one food dispenser at a first location; a second hose configured to connect to the at least one fluid inlet and to removably connect to the at least one food dispenser at a second location; a system controller configured operate the system, and to operatively connect with the at least one food dispenser; and wherein the system may be configured and arranged to circulate fluid through the at least one food dispenser to clean the at least one food dispenser.

The fluid may comprise water, a cleaning solution, and combinations of water and cleaning solution. The first hose may be configured to removably connect to the at least one food dispenser. The first hose may be configured to removably connect to a spray head associated with a hopper on the at least one food dispenser. An outlet attachment may be connected to the second hose and configured to removably attach to an outlet on the at least one food dispenser. A nozzle attachment may be connected to the second hose and configured to removably attach to an outlet nozzle on the at least one food dispenser. The first hose may be configured to removably connect to the food dispenser hopper, a nozzle attachment may be connected to the second hose and may be configured to removably attach to a food dispenser nozzle. The system controller may be configured to selectively operate the at least one food dispenser during cleaning. A cold water inlet, and a mixing chamber may be configured to mix heated fluid with the cold water to lower a temperature of the heated fluid to at or below a predetermined temperature before the fluid is discharged from the system. A gas inlet may controllably communicate with the fluid outlet and may be configured to inject a gas through the at least one food dispenser to purge fluid therefrom. A compressor may be used to inject the gas, which may be filtered air. The system controller may be configured to fill the at least one food dispenser with water, to agitate the water within the at least one food dispenser, and to discharge the water from the at least one food dispenser. The system controller may be configured to fill the at least one food dispenser with a heated cleaning solution, to circulate the heated cleaning solution through the at least one food dispenser for a predetermined period, and to flush the heated cleaning solution from the at least one food dispenser. The cleaning solution may be heated, and preferably heated to a temperature between about 140° F. and about 175° F. A second fluid outlet and a second fluid inlet each may be configured to connect to a second food dispenser. The system may be configured to clean a second food dispenser at the same time that a first food dispenser is being cleaned.

None of these brief summaries of the inventions is intended to limit or otherwise affect the scope of the appended claims, and nothing stated in this Brief Summary of the Invention is intended as a definition of a claim term or phrase or as a disavowal or disclaimer of claim scope.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

FIG. 2 is an exemplary table of operational steps in accordance with certain teachings set forth herein.

Figure 1A:
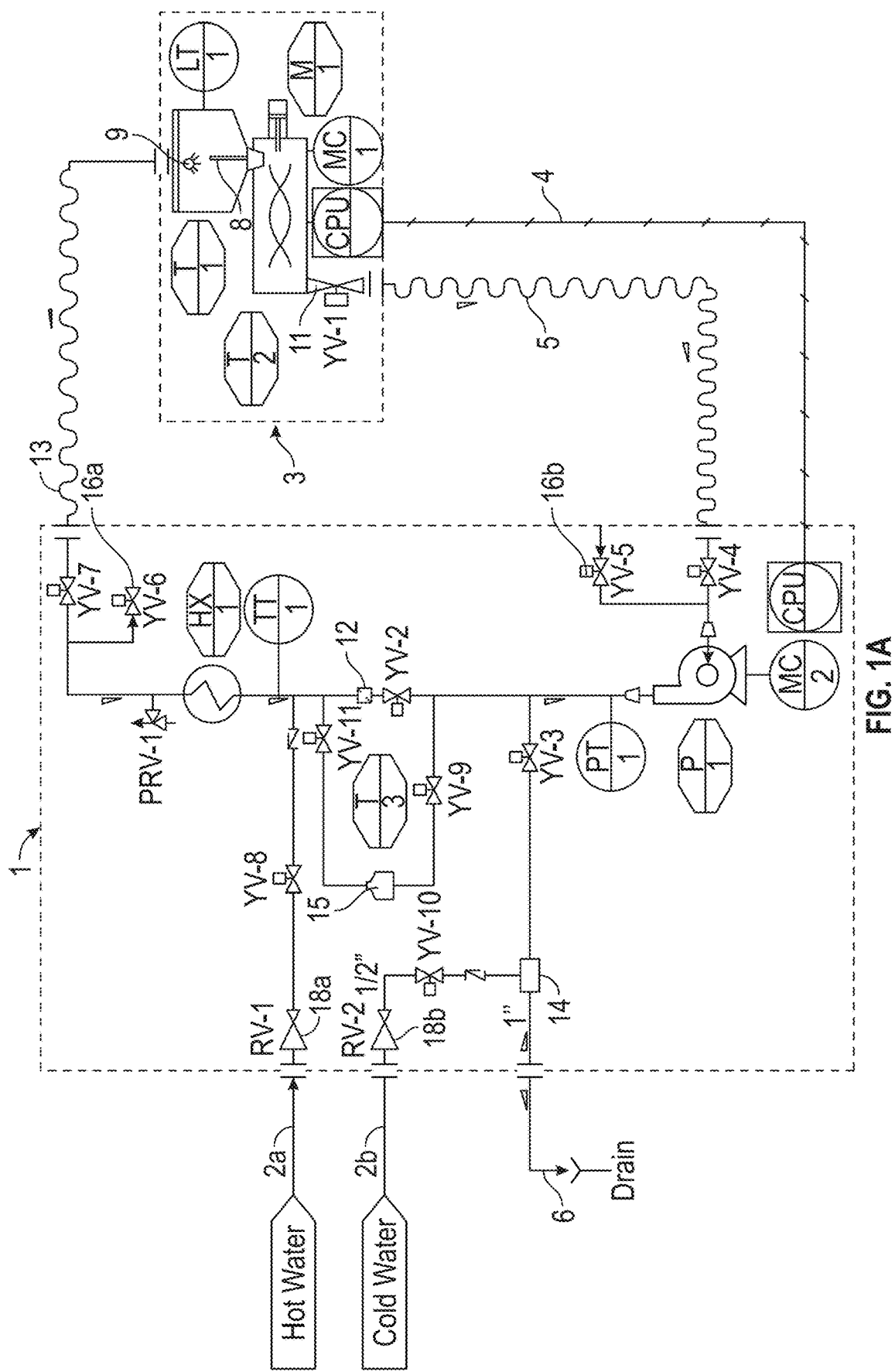
FIG. 1A/B are exemplary piping and instrumentation diagrams in accordance with certain teachings set forth herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Applicants have created methods and apparatuses to clean a food or beverage dispensing machine, and may hold it clean until it is readied for service.

One exemplary embodiment of the inventions disclosed herein may be seen in FIG. 1, which is a piping and instrumentation drawing of a stand-alone cleaning system 1 interfaced with a dispenser 3. Dispenser 3 may be any style of a food or beverage dispenser.

FIG. 1A/B are simplified diagrams illustrating some components of a dispensing machine that may be used to produce soft-serve ice cream or a frozen yogurt product. The dispensing machine 3 includes an ingredients reservoir, a process flow block, a controller, a product chamber, and a dispensing path. In the exemplary dispenser 3, the ingredients, such as dairy or yogurt ingredients, may be loaded into a reservoir or hopper at the top and allowed to flow in a controlled way into a freezing chamber having a refrigeration system associated therewith. A motor M-1 may drive a beater or auger inside of the freezing chamber to mix the ingredients and to provide a consistent product. The freezing barrel opens to a dispense path, which may be controlled automatically or manually. When the path is opened, the product (the frozen beverage or food) is dispensed through a dispensing nozzle into a receiving container such as a cup, mug, or glass.

Figure 1B:
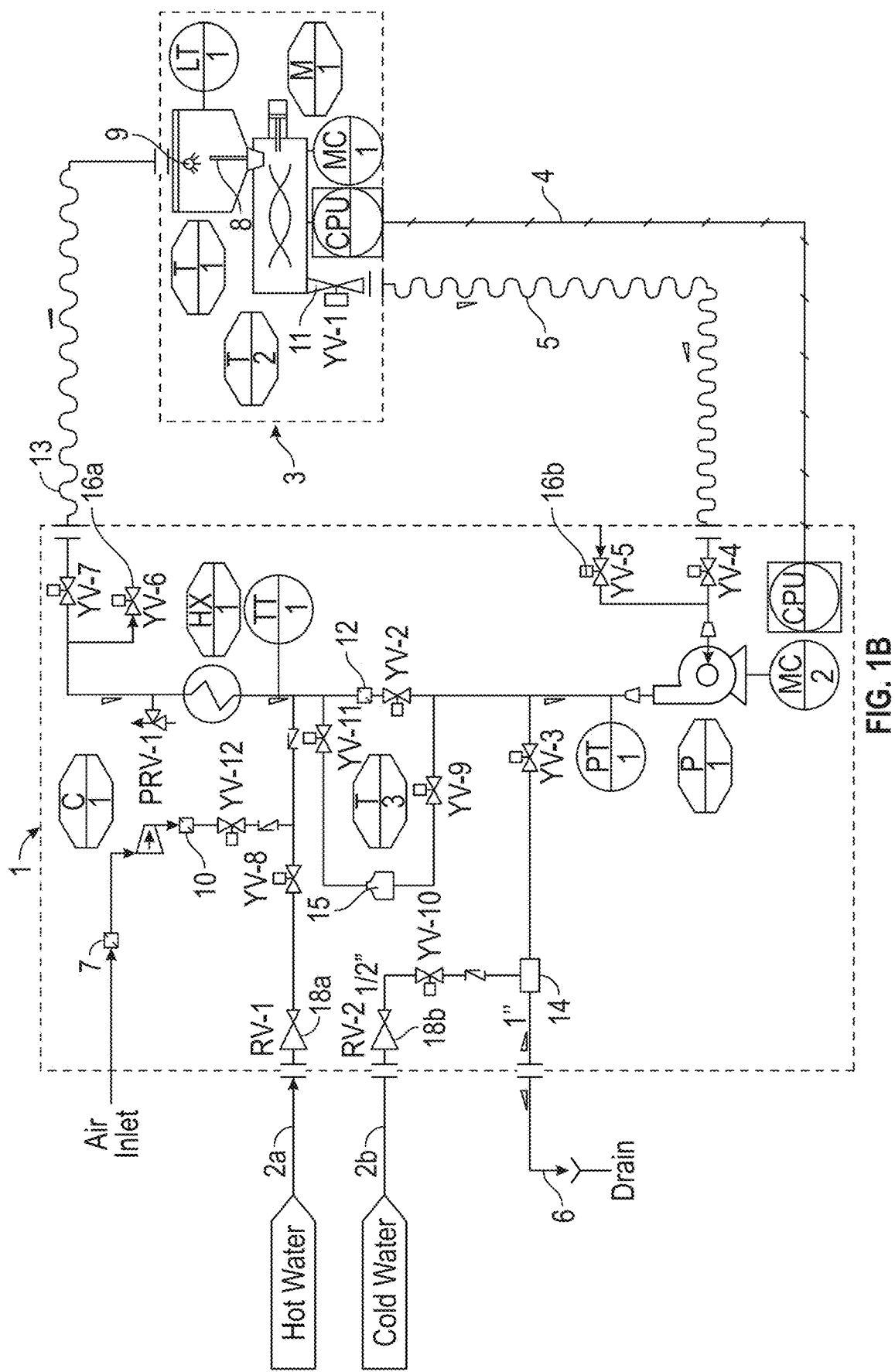

FIG. 1A is a preferred embodiment of the inventions disclosed and taught herein. This embodiment discloses an air vent in the hopper lid, while FIG. 1B is an alternative embodiment disclosing and teaching the use of an air inlet in the cleaning unit 1.

Many prior art beater bars use a shaft at the axial center of the auger. This has been acceptable to couple the ends of the auger to the drive motor and, when needed, to the faceplate and separation plate. Prior art dispensers using a simple shaft within their beater bars have been limited to a dispense rate based upon parameters such as the product freezing chamber, the thermal properties of the product in the freezing chamber, and the refrigeration system capabilities. However, applicants have found that configuring the diameter of the shaft relative to the product freezing chamber relative to other characteristics of the dispenser has advantages over the prior art.

Applicants have been able to increase the dispense rate of a frozen product, while maintaining a desirable consistency and quality. In one of many embodiments, the ratio of barrel size to core size has been refined to meet the product draw and product quality requirements. Optimizing this ratio allows for the proper volume of product to be in contact with the evaporator surface of the freezing chamber while allowing the geometry of the auger to function properly in mixing and circulating the product. In one of many possible alternate embodiments, the core feature of the auger can be composed of graduating diameters of differing sizes from front to back or vice versa to further refine and optimize the capacity and efficiency of the machine.

Figure 16:
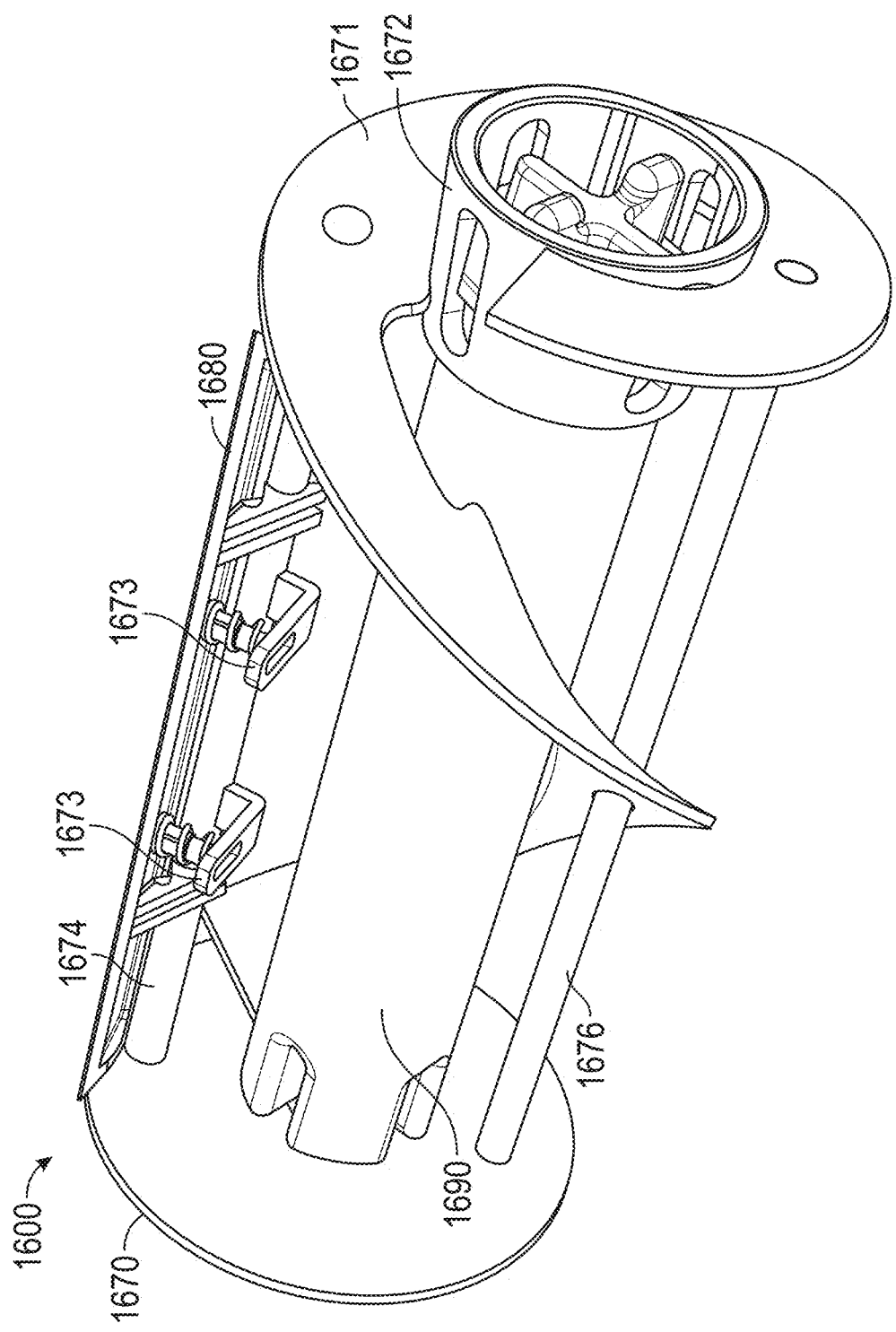
FIG. 16 is a perspective view of a beater bar with a static core in accordance with certain teachings set forth herein.

As may be seen in FIG. 16, the static core 1690 has a larger diameter than the what would be associated with a simple shaft. The static core 1690 limits product that may fill the very center of the freezing chamber, but has the effect of pushing more product towards the inner surface of the freezing chamber. Using a static core in an otherwise prior art dispenser would result in a lower volume of product at any time in the freezing chamber. However, applicants have found that using a static core with an sizable internal volume in conjunction with enlarging the overall volume of the freezing chamber optimizes the annular area in a dispenser. This results in a larger volume of product in the freezing chamber. Optimizing this annular volume and having a larger surface to freeze product on freezes the product faster and can dispense product at a desirable quality and at a higher rate than prior art dispensers.

A preferred embodiment of a static core may be made from acetal, or another material including other polymers, which may be made safe for contact with food. The inside of an exemplary static core may be solidly filled, or may be left hollow and filled with a solid or a fluid such as a gas or liquid. In an envisioned embodiment, the filling may be composed of a substance that retains a temperature so that it may further aid in cooling recently added ingredients, and in maintaining an overall consistent temperature within the freezing chamber.

Other envisioned embodiments include a static core that is configured to enlarge its diameter during use. In one application, a bladder around the static core may be filled producing less volume for product in the freezing chamber when fresh ingredients are added. As noted, this may push the ingredients towards the inner surface of the freezing barrel so that the fresh ingredients contact the inner surface of the freezing chamber. Since the refrigerant is encircling the outside of the freezing barrel, this freezes the fresh ingredients faster. Once the fresh ingredients are at a desirable product quality, the bladder may be deflated. Deflating the bladder in a controlled manner would then increase the volume of the freezing chamber so additional ingredients may be added at a desired rate to optimize a dispense rate while still providing a product with desirable qualities.

Dispensers that dispense frozen carbonated beverages are somewhat similar to the exemplary dispenser 3 in FIG. 1. However, in some cases frozen carbonated beverage dispensers may have a freezing barrel that is kept under pressure, and where the ingredients are injected into the barrel to retain that pressure. In that case, the ingredients may include syrup, water, and a gas, such as carbon dioxide. Even with these differences, the inventions disclosed and taught herein may be applied to frozen carbonated beverage dispensers.

The cleaning unit 1 may be designed to attach to the dispenser 3 to control the cleaning of the portions of the dispenser 3 that come into contact with the ingredients and the product. The feed hose 13 and the drain hose 5 are connected between the cleaning unit 1 and the dispenser 3. Additionally, a data cable 4 is connected to link the controllers of the dispenser 3 and the cleaning unit 1. The cleaning unit 1 may also have an inlet for water, an inlet for air, and an outlet that may direct discharge fluids to a drain 6. The exemplary embodiment of FIG. 1A/B shows two sources of water: a hot water source 2a and a cold water source 2b. Pressure regulators 18a and 18b may be deployed to prevent the pressure in the system from reaching undesirable limits.

Figure 7:
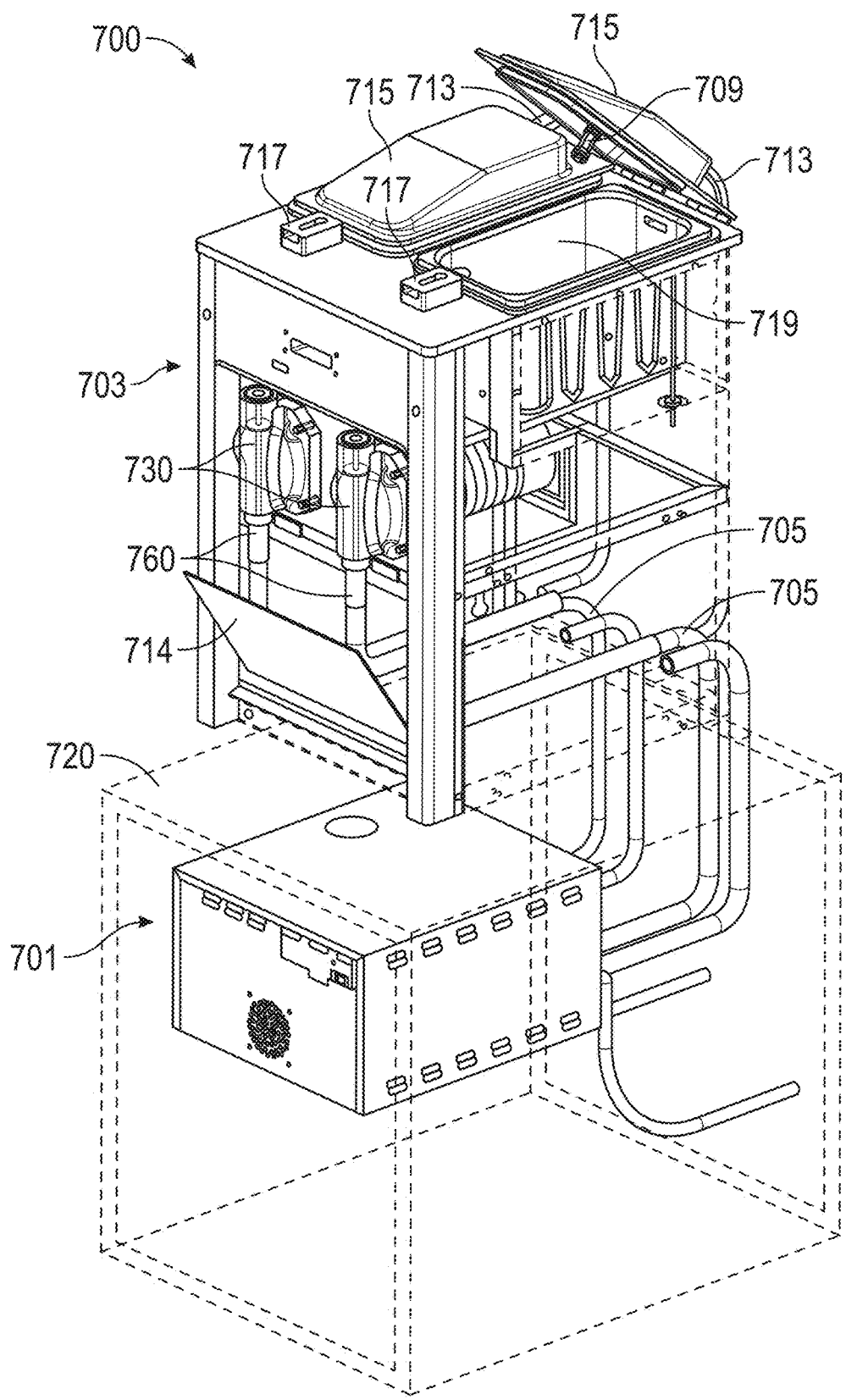
FIG. 7 is a Soft Serve apparatus with a modular clean-in-place cleaning system in accordance with certain teachings set forth herein.

FIG. 7 shows an embodiment of an exemplary unit 700 as disclosed herein. In this exemplary embodiment, dispenser 703 is configured to sit atop a counter 720, with cleaning unit 701 configured to be mounted beneath the counter 720. This exemplary embodiment shows a dispenser 703 with two barrels, each having its own hopper and faceplate. In this embodiment, it may be preferable to run the hoses and other connectors behind the dispenser 703, thereby leaving access to the front of the dispenser 703 open to users. This exemplary unit 700 may utilize two flow paths, which may simultaneously clean the two barrels and their hoppers. Other embodiments utilizing the disclosures and teachings herein may be envisioned by those who are ordinarily skilled in the art that cleans a single barrel and hopper at a time, or may clean both barrels and hoppers in a sequential operation.

Figure 8:
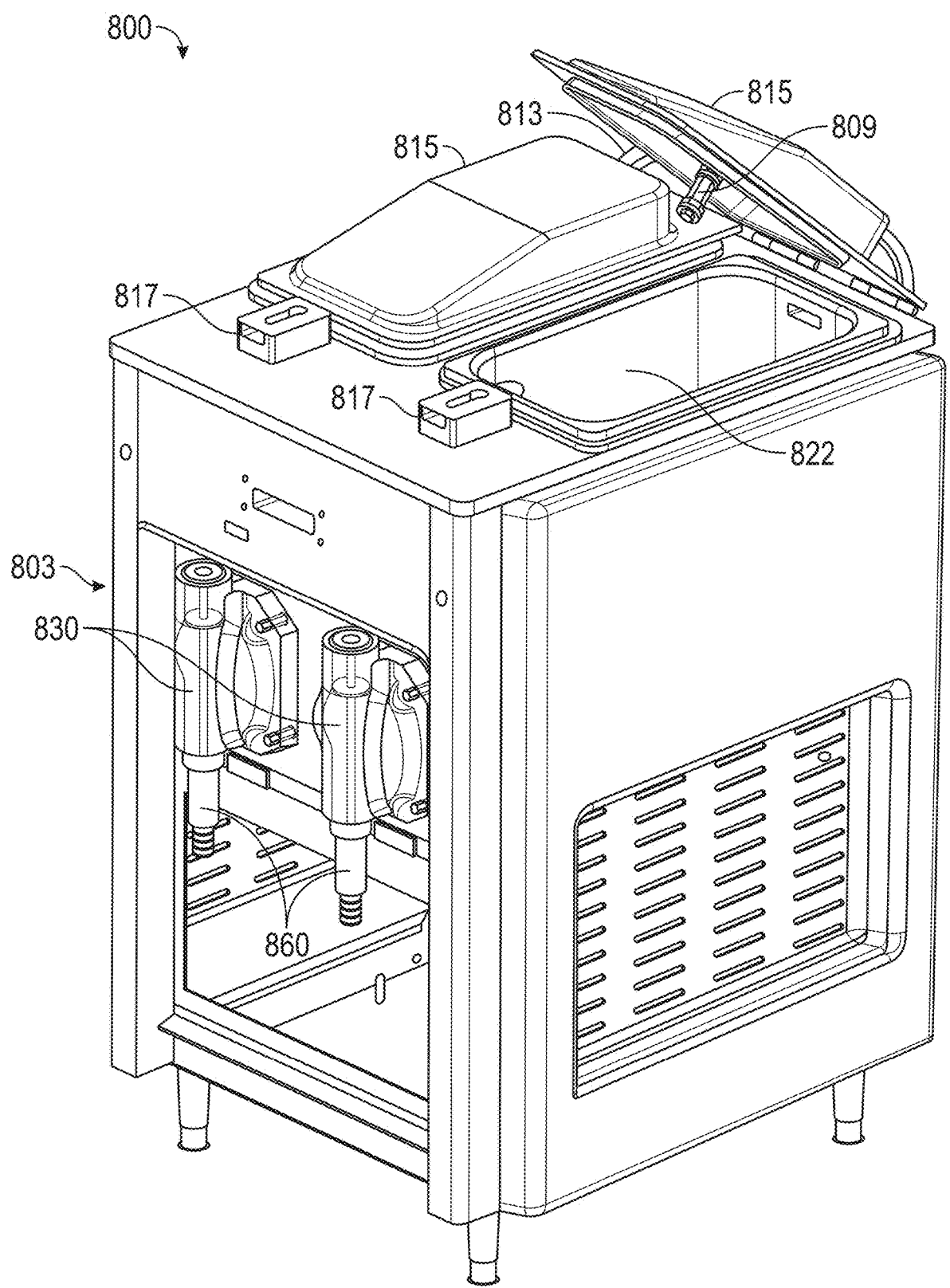
FIG. 8 is a Soft Serve apparatus with an integrated Lid Spray Attachment in accordance with certain teachings set forth herein.

Another exemplary embodiment may be seen in FIG. 8, where the dispense unit 803 is freestanding on legs. In an embodiment such as this, it may be possible to integrate some or all of the clean-in-place unit into the dispenser.

Before cleaning is initiated, the connections may be established. Referring back to FIG. 1, first, a feed hose 13 connects from the cleaning unit 1 to the dispenser 3. In this exemplary dispenser 3, the hopper lid may be constructed with a sprayer 9 such that it has a mechanism to connect to the feed hose 13. This may be a quick-connect or any other suitable connector. In another envisioned embodiment, the hopper lid may not have a sprayer 9 attached but the hopper lid may be replaced with a component that has a sprayer 9 that fits over the hopper opening. In that situation, the hopper lid may be cleaned separately. Other embodiments may be envisioned by those familiar with the art without departing from the spirit of the inventions disclosed herein. If the feed hose 13 is a coilable hose, or a hose that may otherwise exert some pulling force to draw the remote end back to the cleaning unit 1, then it may be preferred to secure the lid to the dispenser 3 for the duration of the cleaning process. Any number of suitable mechanisms may be applied to perform this function including, but not limited to straps, magnets, mechanical clasps and hasps, threadable members, and others.

Referring to FIGS. 7 and 8, these exemplary embodiments have hopper lids 715, 815 that are connected to the dispensing unit 703, 803. Each lid 715, 815 has a feed hose 713, 813 secured to the back of each lid 715, 815. This connection may be unobtrusive and flexible so as to not interfere with normal operations of loading ingredients into the hoppers. Each hopper lid 715, 815 has a latch 717, 817, which may be used to secure the lids 715, 815 into their shut configuration. Sensors may be placed into the lids 715, 815 and/or latches 717, 817 to indicate the position of the lids 715, 815, and if they are secured in place.

FIG. 7 also shows a hatch 714. When the dispenser 703 is in normal operation for dispensing product, the hatch 714 may be in the closed position hiding from view the internals of the dispenser 703. However, when the dispenser 703 is configured for cleaning, the hatch 714 may be lowered to allow an operator to connect hoses and connectors that may be stored in the compartment.

Some dispensers have a mix tube 8 to controllably flow ingredients from the hopper to the freezing barrel. A preferred embodiment of the processes and inventions disclosed herein is to remove the mix tube 8 from the hopper before cleaning the dispenser 3 to allow unrestricted fluid communication from the hopper to the freezing chamber. In a preferred embodiment, this may be the only component that may be moved prior to cleaning the dispenser 3. Another embodiment would allow the mix tube to be cleaned in situ or placed into an in-line compartment where it may be cleaned with the rest of the system.

Applicants have found, through experimentation, a hole size ratio that is conducive to a flow of cleaning and sanitizing fluids through the dispenser and also conducive to the flow of ingredients into the freezing chamber. For exemplary dispensers disclosed herein the mix tube hole size may be of sufficient size to drain all of the fluids being injected into the hopper and may generally be around 1 inch in diameter. Applicants have found more benefits by sizing the cross-section of the mix tube 8 to match the output of pump P-1.

If the mix tube 8 is removed from the dispenser 3 for cleaning, it may then require manual cleaning before the dispenser 3 may be placed back into service. The same may be applied to any other component that may be removed prior to cleaning. In an envisioned embodiment, an extended hopper lid with sprayer 9 may be constructed so as to contain all of the removed components. The extended lid with sprayer 9 and the components may then be placed atop the hopper. Sprayer 9 or multiple sprayers in the lid, or other means including tubing that sprays in a configured way, may be used to promote the contact between the water and cleaning fluids with the surfaces of the components contained within the extended lid and hopper space that need to be cleaned. When deployed in this manner, the parts may be washed and sanitized at the same time and in the same process as the rest of the dispenser 3. After cleaning and sanitizing, the components may be replaced in the dispenser 3. Other means for cleaning any components removed from the dispenser 3 within the system as disclosed herein may be envisioned by those familiar with the art without departing from the spirit of the systems and methods disclosed and taught herein.

A rotosprayer 709, 809 may be permanently installed into a lid 715, 815. Typical rotosprayers may spin or rotate during operation so that the fluids (rinse water, cleaning, and/or sanitizing fluids, and gases) contact the interior of the hopper 719, 819, at different points throughout the operation.

Applicants have found that a flexible feed hose 713, 813 may be attached to an elevated surface at the back of the lid 715, 815 to conceal the feed hose 713, 813. This unobtrusively hides the connections. In this configuration, some care should be taken that the sprayer should be low enough into the hopper 719, 819 so the spray may hit all surfaces including the underside of the lid 715, 815. However, the sprayer should not be placed far enough below the underside of the lid 715, 815 so that it descends into the ingredients in the hopper 719, 819.

In one of many possible envisioned embodiments, sensors (not shown) may be placed in the hopper 719, 819, or in the lid 715, 815 to indicate the level of the ingredients and to warn the operator if the rotosprayer 709, 809 may contact the ingredients. These sensors may activate a mechanism that prevents the lid from closing if the level is too high.

In yet another of many possible envisioned embodiments, the rotosprayer 709, 809 may be mechanically retractable so that in its resting position—when it is not actively spraying—it fits against the lower surface of the lid 715, 815, or into a slot configured to hold it. This may be accomplished in any number of ways such as by the rotosprayer 709, 809 being mechanically foldable such that an operator has to twist it into position, or otherwise move it so it is operable.

In another envisioned embodiment, the rotosprayer 709, 809 may be vertically extendable and biased to rest in a retracted position such as with a spring. Then when the rotosprayer 709, 809 is activated, the water pressure from the feed hose 713, 813 overcomes the bias to extend the rotosprayer 709, 809 into a desirable position. With this configuration, it may be desirable to cyclically extend and retract the rotosprayer 709, 809 during operation so that more of the inner surfaces of the hopper 719, 819 may be sprayed by the rotosprayer 709, 809 at different elevations.

In yet another of many possible embodiments, the rotosprayer 709, 809 may be configured to be rotatable about a center at some point in the lower surface of the lid 715, 815. In this embodiment, the rotosprayer may oscillate around the center either in a plane parallel to the lower surface of the lid 715, 815, or in a plane divergent from the lower surface of the lid 715, 815.

A drain hose 5 may also be connected from the cleaning unit 1 to the dispenser 3. Similar to the feed hose 13, the drain hose 5 may be coilable. Self-coiling hoses may be desirable where applicable to aid in keeping the cleaning unit 1 self-contained. The feed hose 13 and the drain hose 5 may have similar characteristics such as connectors and internal diameter. This may make them interchangeable so that if either becomes damaged, a single replacement hose may be used. However, Applicants have found that having a drain hose 5 of a larger cross section than that of the feed hose 13 may have other benefits. In one way, having different sizes of hoses and connectors may prevent the hoses from being connected to the incorrect connectors. In another aspect, having a larger sized drain hose 5 may be preferred to reduce the likelihood of a clog backing up the system. Similarly, the product may be more viscous than water and having a larger sized hose may facilitate draining and may prevent pump cavitation. Also, having an egress path for the fluids having larger cross-section areas than ingress cross-section areas promotes draining.

In one envisioned embodiment, a cowling may be used to connect the drain hose 5 to the dispenser 3. This cowling (not shown) may be configured such that it may be secured to the outside of the dispense nozzle. In that embodiment, the cowling may be configured such that the discharge from the dispense nozzle is forced to contact the interior and exterior surfaces of the nozzle before draining back to the cleaning unit 1 through the drain hose 5. In another envisioned embodiment, the dispense nozzle may be disconnected from the dispenser 3 and the drain hose 5 may be connected in its place. In that embodiment, the dispense nozzle may be cleaned separately. As may be apparent to those familiar with the art, the inventions disclosed and taught herein may be applied to food dispensers having multi-valve dispensing nozzles.

Figure 9:
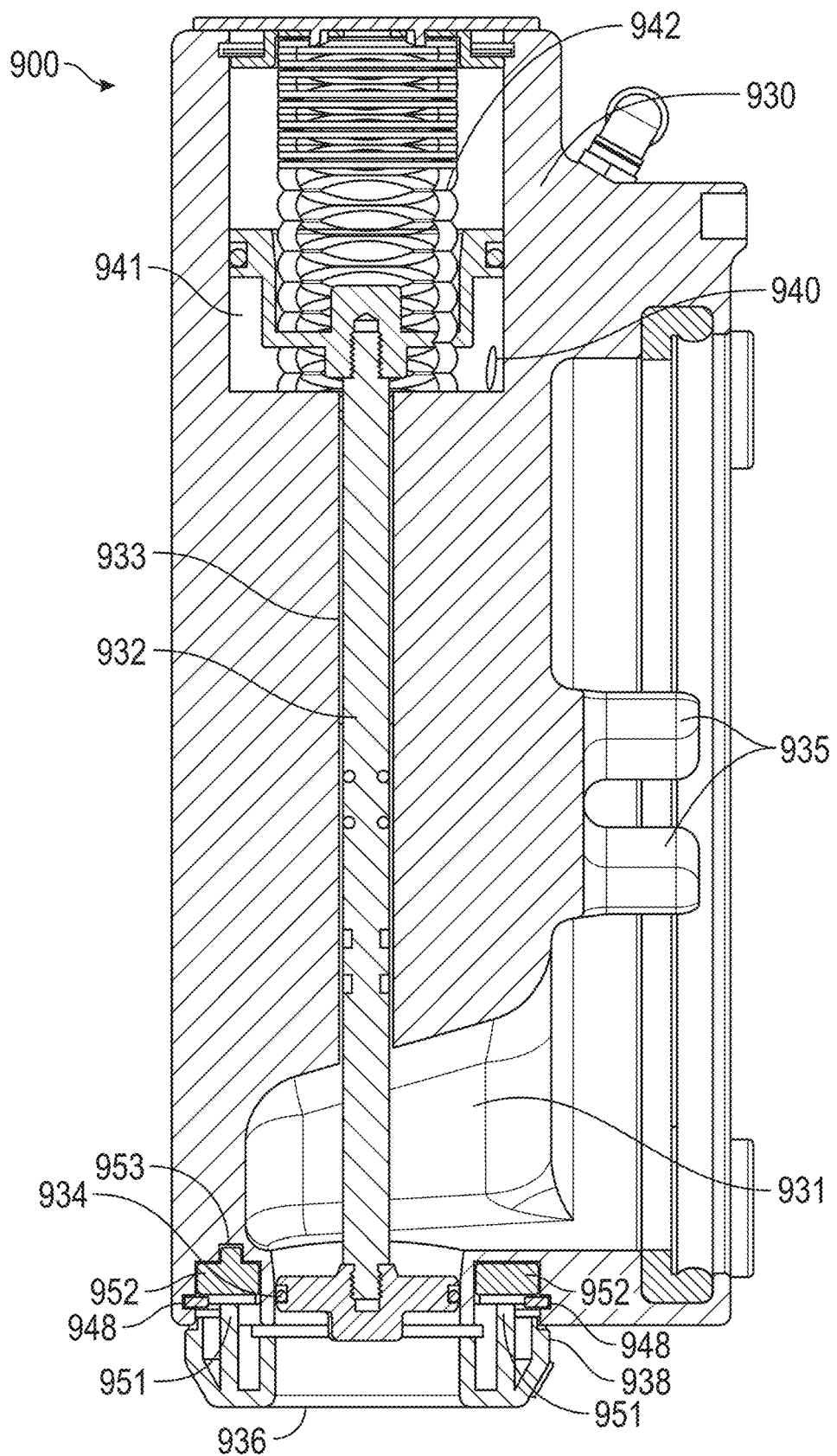
FIG. 9 is a cross-section view of a faceplate and decorative dispense cap in accordance with certain teachings set forth herein.

Applicants have found that the length of the dispense nozzle has an effect on the cleaning process. In some cases, longer dispense nozzles may retain some of the product after a dispense operation. FIG. 9 shows a cross-section of a faceplate 900 of a beverage dispenser of an exemplary embodiment as disclosed herein. This faceplate 900 may also be seen as 730 and 830 in FIGS. 7 and 8 respectively. Faceplates as described in U.S. patent applications Ser. Nos. 15/018,185, 15/220,825, and 15/220,878 may have features that may be used with the invention disclosed herein, the contents of which are incorporated by reference in their entireties.

A valve stem assembly 932 is located within a valve stem shaft 933 and may be activated to move the dispense valve 934 into an open or closed position. In FIG. 9, the dispense valve 934 is shown in the closed position. When the valve stem assembly 932 is raised, the dispense valve 934 is also raised to allow product to flow out of the nozzle 936.

In FIG. 9, a decorative cap 938 is attached to the faceplate 930. The decorative cap 936 allows the product to flow out of the nozzle 936 in a controlled way. In exemplary embodiments, the decorative cap 938 may have a circular opening with vertical sides for the nozzle 936, or it may have conical sides sloping inwards from top to bottom, or from bottom to top.

Other exemplary decorative caps 938 may have nozzle openings 936 of specific shapes. In a beverage dispenser configured to dispense a soft-serve product such as frozen yoghurt or soft serve ice cream, triangular, square, and star shaped nozzle openings may dispense a product in a manner that has a distinct and/or decorative shape.

Applicants have seen that traditional decorative caps (not shown) may retain some product after dispensing. Applicants have found that the amount of product retained may be greatly reduced or even eliminated by utilizing a decorative or product-shaping cap 938 that is shorter than prior art caps.

Figure 10:
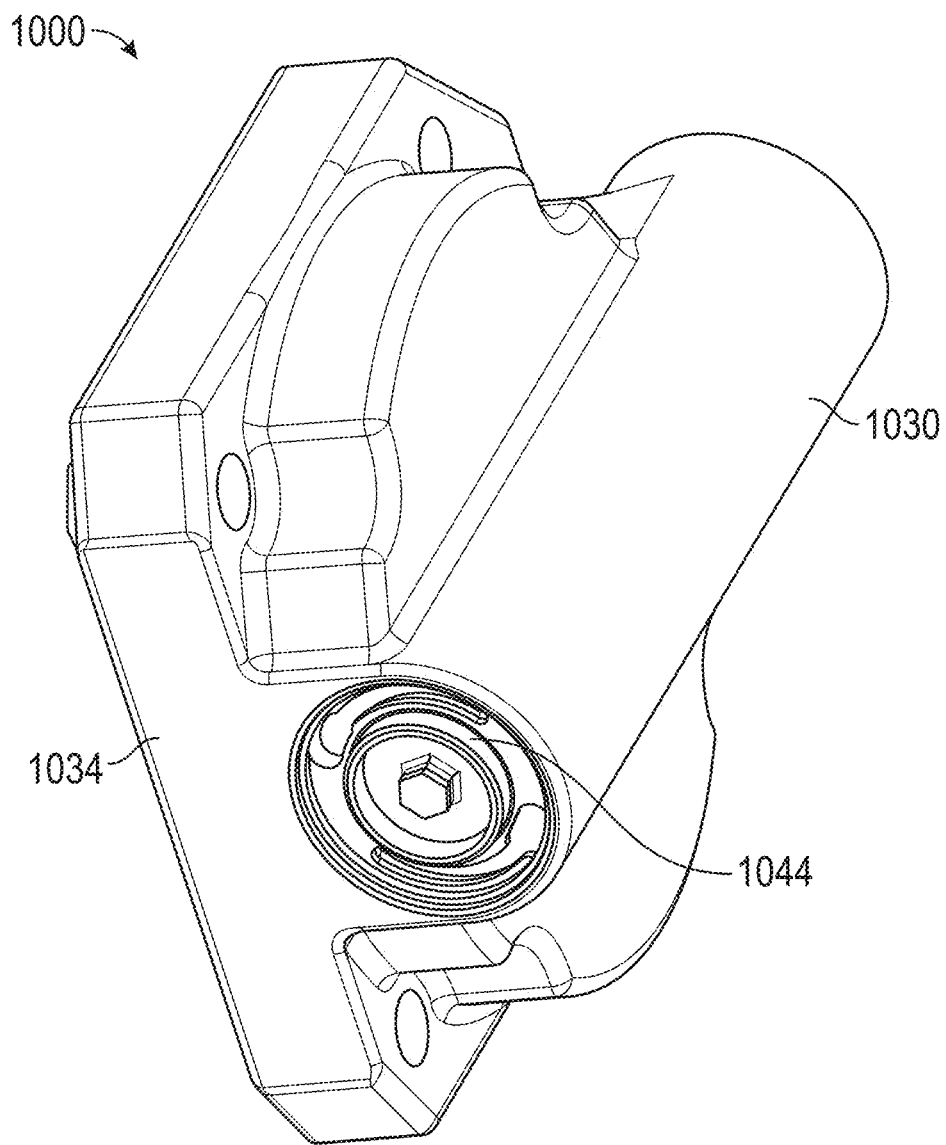
FIG. 10 is a perspective view of a faceplate in accordance with certain teachings set forth herein.
Figure 11:
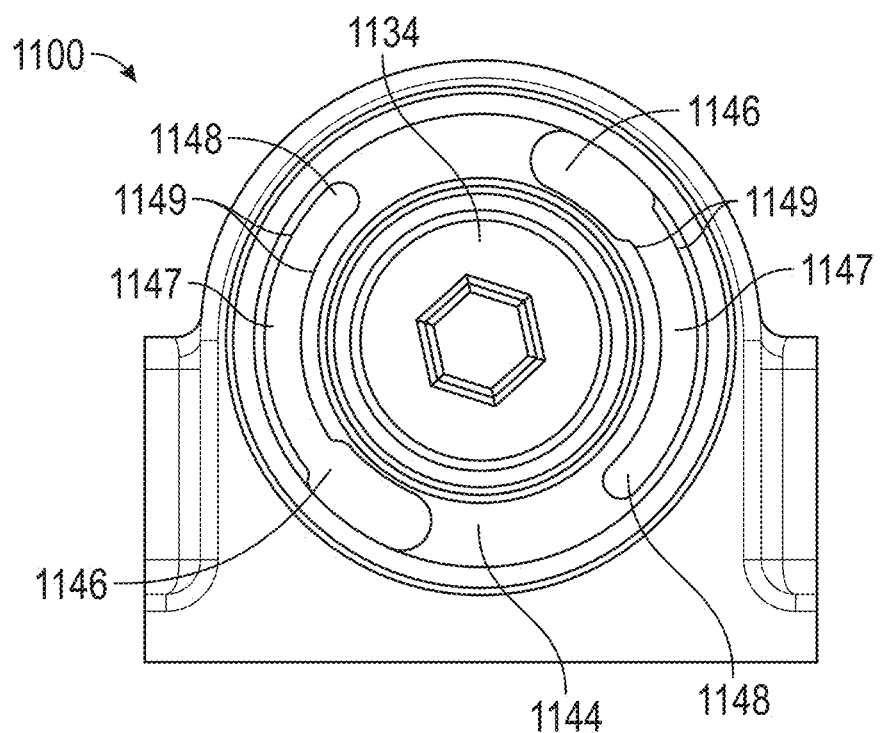
FIG. 11 is an underneath view of a faceplate in accordance with certain teachings set forth herein.
Figure 12:
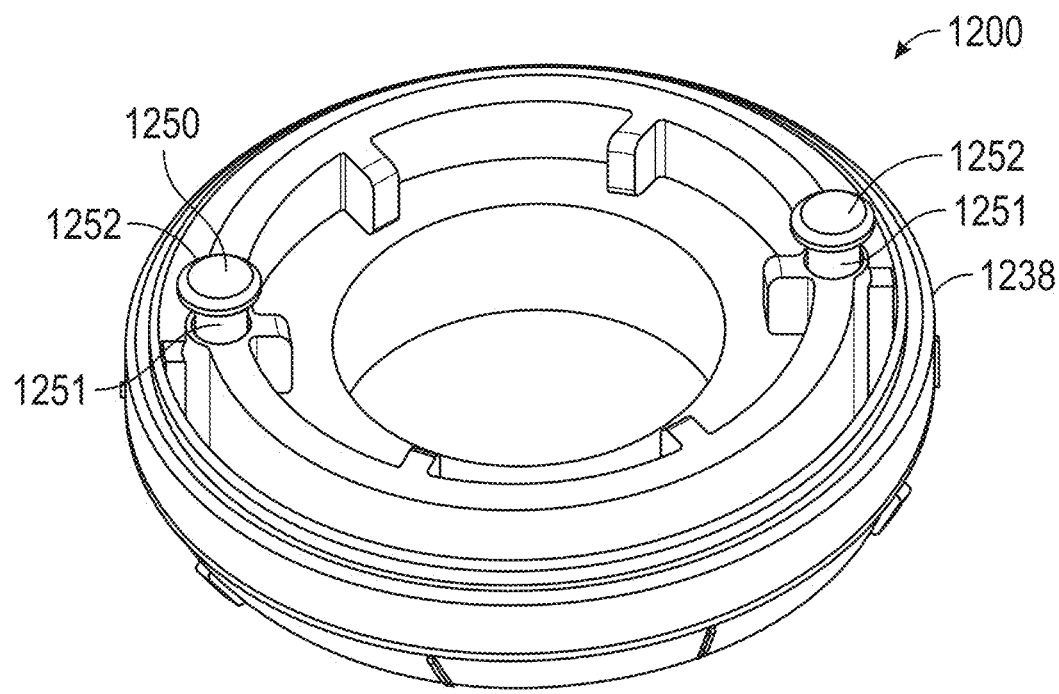
FIG. 12 is a perspective view of a decorative cap in accordance with certain teachings set forth herein.

In an exemplary embodiment, decorative cap 938 may be retained to the faceplate 930 through a locking ring and locking pins as shown in FIGS. 10, 11, and 12.

FIG. 10 shows a faceplate 1030 with a dispense valve 1034, and a locking ring 1035. In one embodiment, a locking ring 1044 may be formed integral with the faceplate 1030. In another embodiment, the locking ring 1044 may be manufactured separately and then secured to the faceplate 1030 through any number of methods including, but not limited to threads, mastics, glues, cements, and/or magnets.

FIG. 11 shows a view of the bottom surface of the locking ring 1144. In this embodiment, two channels 1146, 1147, 1148 are formed. Other embodiments may utilize other numbers of channels. The insertion channel 1146 is wide and may have vertical sides from the bottom surface of the locking ring 1144 into the interior of the locking ring 1144. The retaining channel 1147 has lips 1149 at the lower portion that is narrower than the width of the insertion channel 1146. These lips 1149 extend only a portion of the way into the locking ring 1144.

Lips 1149 may be formed by cutting out a portion of the material of the locking ring 1144, leaving lips 1149, or they may be formed by other means. Referring back to FIG. 9, lips 948 may be formed by an expandable insert that presses outwardly away from the center of the nozzle 936. Other embodiments may be envisioned by those familiar with the art without departing from the spirit of the inventions disclosed herein. The channels come to a channel end 1148.

FIG. 12 shows an exemplary embodiment of a decorative cap 1238. In this embodiment, two locking pins 1250 are attached to the top surface of the decorative cap 1238. Each of the locking pins 1250 is comprised of a vertical shaft 1251 and a locking pin cap 1252, which extends beyond the diameter of the central shaft 1251. The locking pin shaft 951 and locking pin cap 952 may be seen in FIG. 9 as well. In the embodiment 1200 in FIG. 12, the locking pins 1250 are identical.

To attach the decorative cap 1238 to the locking ring 1144, the decorative cap is positioned with the locking pins 1250 facing upwards. The decorative cap 1250 is positioned where the locking pins 1250 may be inserted into the insertion channels 1146 and is rotated so the locking pins 1250 move towards the retaining channel 1147, until the locking pins 1250 engage the channel end 1148 of the channel. In this exemplary embodiment, a quarter-turn of the decorative cap 1238 will seat the decorative cap 1238.

A gasket (not shown) may be inserted between the locking ring 1144 and the decorative cap 1238. The force of this gasket may prevent unwanted movement of the decorative cap 1238 after it has been rotated into place. Other means may be envisioned by those skilled in the art without departing from the spirit of the inventions disclosed herein.

Additional means may be utilized to retain the decorative cap 1238 in its secured position. These means may include but are not limited to an interference fit with the sides of the retaining channel 1147, the use of magnets, or other means.

While this exemplary embodiment has identical locking pins 1250, other embodiments have been proposed by the Applicants. Referring back to FIG. 9, one of the locking pin caps 952 has a locking pin cap extension 953. If the locking ring has a keyway in only one channel that will fit the extension, then the decorative cap can only be attached in one orientation. In one of many possible uses, this may be preferred if an operator wishes to present a design to a user on a specific face of the cap. The embodiment described herein will only allow the cap to be attached in a specific orientation.

Figure 13:
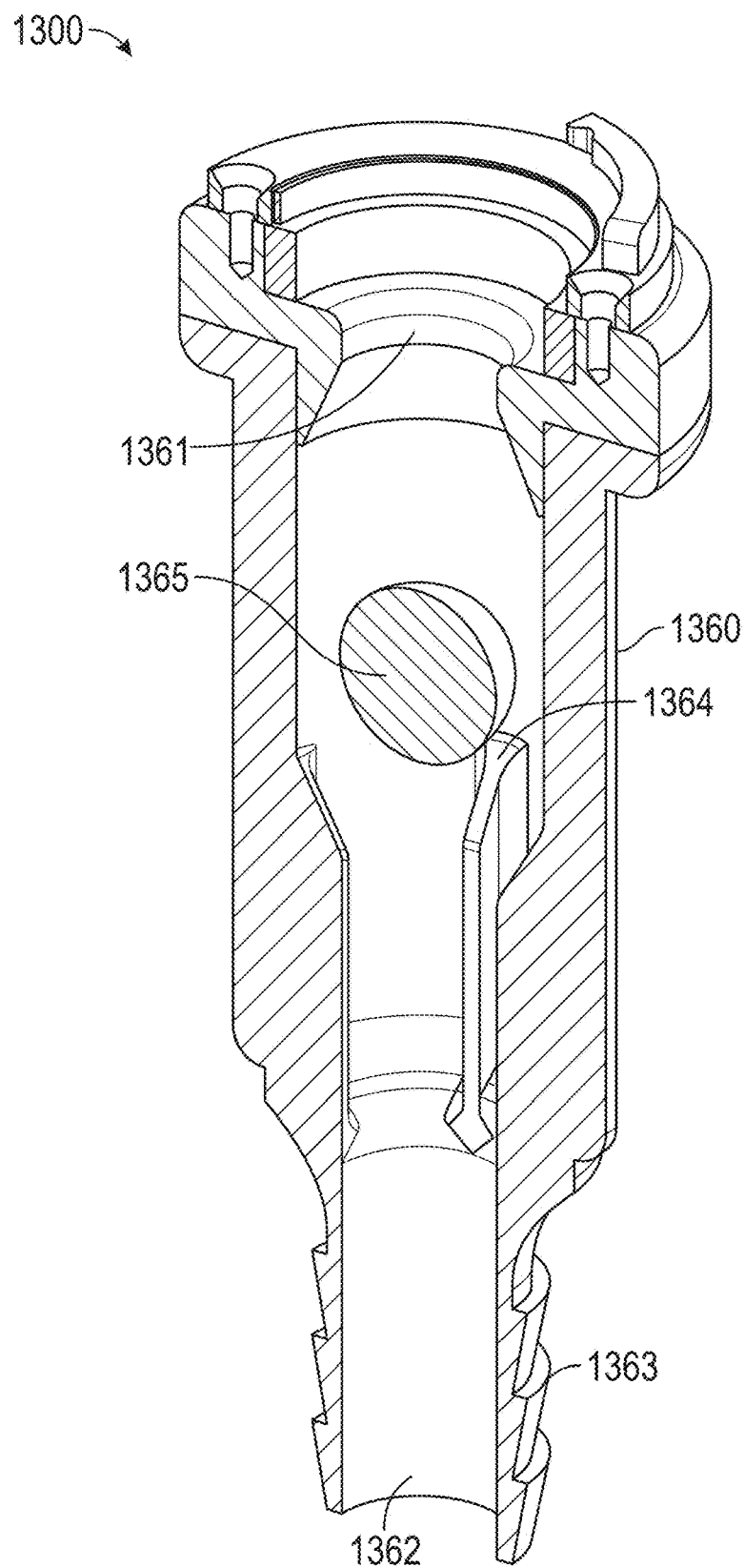
FIG. 13 is Face-plate Coupler attachment in accordance with certain teachings set forth herein.

When it is time to clean the dispenser the decorative cap 938, 1238 may be removed and replaced with a cleaning connector 1360 as shown in FIG. 13, which is a cut-away view of an exemplary cleaning connector. This exemplary embodiment of a cleaning connector 1360 may have locking pins in the same configuration as the decorative cap 1238 such that when the decorative cap 1238 is removed, it may be replaced with the cleaning connector 1360. Cleaning connector 1361 has a top opening 1361, a bottom opening 1362, internal fins 1364, and a float check ball 1365.

Since cleaning the dispenser also involves cleaning the decorative or shaping cap, the cap may be manually cleaned while the dispenser is being cleaned by the processes and methods disclosed herein, or it may be placed into the hopper to be cleaned with any other parts as noted elsewhere in this specification.

Referring back to FIGS. 7 and 8, cleaning connectors 760, 860 are shown. In FIG. 7, cleaning connector 760 is shown connected to drain hose 705. In FIG. 13, the bottom opening 1362 is connected to the drain hose (not shown) with a barb connector 1363. Other means for connecting the drain hose may be envisioned by those sufficiently skilled in the art without departing from the inventions disclosed herein.

Float check ball 1365 may be used to prevent a spill of liquid when it is being attached or removed. If there is any liquid inside the cleaning connector 1360, the float check ball 1365 will float up and rest against the narrowing neck of the top opening thereby forming a temporary seal. In operation, a flow of liquid downwards through the cleaning connector 1360 will push the float check ball 1365 to rest against the internal fins 1364. The liquid will flow around the float check ball 1365 to exit through the bottom opening.

Figure 14:
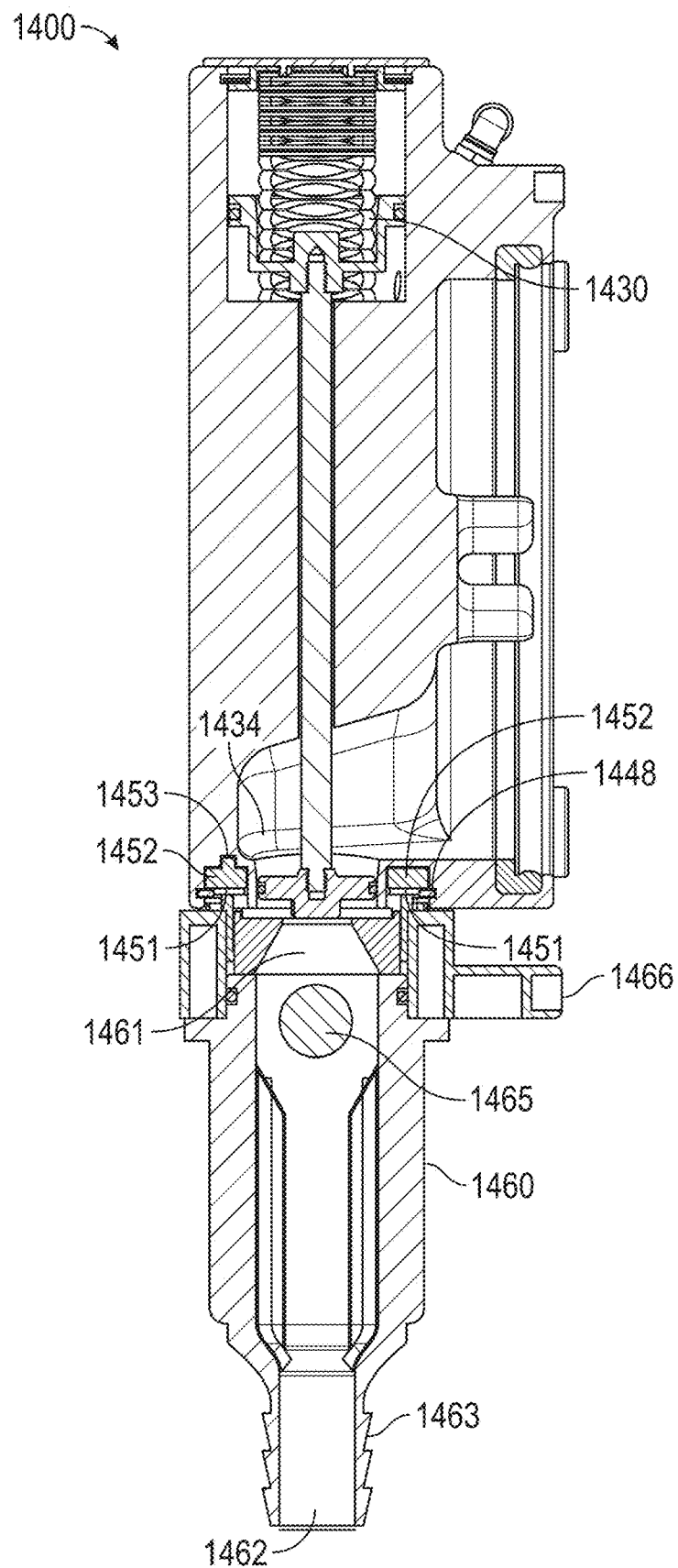
FIG. 14 is a cross-section view of a faceplate and clean-in-place dispense adapter in accordance with certain teachings set forth herein.

FIG. 14 shows a cleaning connector 1460 attached to a faceplate 1430 of an exemplary embodiment as disclosed herein. Similar to the decorative cap 1238, the cleaning connector 1460 may be attached with central shafts 1451 and locking pin caps 1452 that fit and retain the cleaning connector 1460 in the retaining channels. This may also have a keyway and locking pin cap extension 1453 to ensure a predetermined orientation of the cleaning connector 1460.

A sensor 1466 may be an integral part of the cleaning connector 1460. Some of many possible uses here may be to detect the velocity and/or acceleration of flow and direction of fluid, the alkalinity of the fluid, the temperature of the fluid, and many other aspects of the fluids passing through this point of the apparatus.

The sensor 1466 may be connected to other components via a wire or wirelessly through means known to those familiar with the art. Similarly, the sensor 1466 may send signals through acoustic pulses through the fluids within the dispenser, or through vibrations through the rigid portions of the dispenser.

Sensor 1466 may also be used to ensure that the adaptor has been properly attached and seated. In one embodiment, a magnet may be contained in the dispenser near to the cleaning connector 1460. Then, when the cleaning connector 1460 is correctly positioned and secured, the magnet may activate a sensor that indicates that the unit is ready for cleaning. If the sensor is not activated, then the processor may display an error message and suggest corrective action to a worker, so the problem may be addressed.

While a single data cable 4 has been used by applicants in this exemplary embodiment, other means of communicating information may be envisioned by those familiar with the art, such as, but not limited to wireless communications, high-speed multipoint communications network such as an Ethernet, other photonic means such as infra-red signaling communications, and acoustic means such as pulses through the fluids or rigid portions of the dispenser and its base.

Applicants have found that a CAN bus protocol used with data cable 4 produces satisfactory results for communications between cleaning unit 1 and beverage dispenser 3. Other protocols known to those familiar with the art may be used for this application. In some cases it may be desirable to have a physical connector that is unique or that has a locking feature. This may be used to prevent connections to unauthorized devices or other reasons. A locking feature may be useful to restrain the data cable in its place if it is inadvertently pulled. In an envisioned embodiment, a process may be placed into the processor of the dispenser containing actions to take if the data cable is disconnected.

In some cases, it may be desirable to have the data line and connector integrated with one or both of the hoses such that data communications won't begin until the hoses are connected properly. This would then ensure that a cleaning process would not begin until the hoses are properly connected.

An additional way to prevent connections to unauthorized devices may be through the use of cryptographic techniques known to those familiar with the art. The devices may be manufactured with electronic certificates or other credentials that may be exchanged to verify identities and provide authentication. Alternatively, electronic certificates or other credentials may be entered into the devices after manufacture. These credentials may be installed using tamper-proof or tamper-evident means such as, but not limited to, means defined in the Federal Information Processing Standards (FIPS) 140 publication series.

Verification that events have happened during the cleaning cycle are important to providing assurance that the beverage dispensing unit has been properly cleaned. The sensors, processors, and controllers on the beverage dispenser 3 may use the data cable 4 to transmit event messages to a processor with memory on the cleaning unit 1. These event messages may be stored as logs or journals in the memory of the cleaning unit 1, and may be reviewed at later times.

There may be actions that cannot be entirely automated and must be completed by an operator. In some cases, it may be desirable to assign user identifiers to individuals that operate the cleaning process. An operator may then sign-in to the cleaning unit 1 with appropriate credentials, such as, but not limited to, a username and password. When the operator completes an action, such as adding detergent or connecting/disconnecting hoses, that action will be associated with that operator and logged in the memory of the cleaning unit.

The cleaning unit 1 may have an inlet for water. This may be any water supply including a reservoir, but a preferred embodiment is to have a potable water supply near the cleaning unit 1 that may be connected. If the cleaning unit 1 is constructed to be mobile, then a connection may be made via a removable hose to a water spigot or nearby faucet. Alternatively, if the cleaning unit 1 is configured to be permanently located near the dispenser 3, then a more permanent water supply may be piped to the cleaning unit 1. This may be the same water supply that is used in dispensers that require water as an ingredient. The preferred exemplary embodiment of FIG. 1A uses both a hot water source 2a and a cold water source 2b. Other embodiments include a connection to a single hot water source where the fluids in the dispenser may be cooled using the refrigeration system, or to a cold water source where the fluids may be heated with a heat exchanger or by running the refrigeration system in reverse.

In the alternate embodiment of FIG. 1B, the cleaning unit 1 may have an inlet for air 7 or compressed gas. In a preferred embodiment, this may be coupled with filters 10 and an air compressor. Also in a preferred embodiment, a check valve may be used to prevent water from backing up to reach the filters 10 or the air compressor.

In another envisioned embodiment, other means for disinfecting the system may be deployed in conjunction with some or all of the other methods and apparatuses disclosed and taught herein. In one envisioned embodiment, irradiating light may be used to disinfect the dispenser. Irradiating light, such as but not limited to an ultraviolet (UV) light source may be deployed at any number of locations within the dispenser to help achieve this. In one embodiment, an irradiating light source may be placed within the hopper, such as in the hopper lid, to irradiate the cleaning fluids entering there. In another embodiment, an irradiating light source may be placed in line with the water and air sources to irradiate and disinfect those fluids before they enter the dispenser. Other embodiments may be envisioned by those ordinarily skilled in the art without departing from the spirit of the inventions disclosed and taught herein.

The process for this and the inventions disclosed herein may be better understood by following an exemplary cleaning process, such as that depicted in FIG. 2. It may be appreciated that this is one of many possible cleaning processes. Other cleaning processes may be envisioned that utilize the steps listed here in different orders, or with different times or other characteristics. Similarly, other steps may be added to other cleaning processes without departing from the spirit of the inventions disclosed and taught herein.

When a dispenser 3 is taken out of service for cleaning, some ingredients and some product may remain in the hopper and in the freezing barrel. Applicants have found that the processes disclosed herein are more efficient if as much of the product is removed from the system prior to attaching the drain hose 5. However, the apparatuses and methods described herein may work even if no product is removed prior to attaching drain hose 5 and starting the cleaning process. The initial rinse of Step 1 in FIG. 2 may be done by starting a flow of water by allowing water through the system. This may be done by opening valve YV-7, opening the dispense path valve YV-1, and opening valves YV-3 and YV-4 to the drain 6. Simultaneously, or at some time after opening these valves, the pump P-1 may be started to force the expulsion of the discharge to the drain 6.

Referring to FIG. 9, in one of many possible embodiments, the valve stem assembly 932 may be raised pneumatically. Exemplary embodiment 900 shows one method of activating the valve stem assembly pneumatically in that a spring 942 biases the valve stem assembly 932 downward. When a gas or other fluid is pumped into pneumatic chamber 941, such as by through pneumatic orifice 940, the gas pressure may overcome the downward bias of the spring 942 to raise the valve stem assembly 932, thereby opening the dispense valve 934 and allowing product to dispense through the nozzle 936. Allowing the gas or other fluid to exit the pneumatic orifice 940 to decrease the pressure in the pneumatic chamber 941 allows the bias of the spring 942 to overcome the pressure in the pneumatic chamber 941 thereby lowering the valve stem assembly 932 and closing the dispense valve 934. Other embodiments utilizing the disclosures and teachings herein may be envisioned by those who are ordinarily skilled in the art.

Those familiar with the art may find it convenient to use a gas associated with the product, such as carbon dioxide, nitrogen, or other gases, to pneumatically activate the valve stem assembly 932.

Applicants have found that in multi-barrel dispensers, such as those shown in FIGS. 7 and 8, it may be desirable to have a distinct setting that will place the faceplates in fluid communication with each other to aid in cleaning. As may be seen in FIG. 9, when the valve stem assembly 932 is raised, a fluid path will be opened between the freezing barrel (not shown in FIG. 9) and the nozzle 936. Raising the valve stem assembly 936 to a specific height not normally used for ordinary dispensing operations may open a passageway for fluid communications between the faceplates. In one exemplary embodiment, his may require the controller to raise the valve stem assemblies of each of the faceplates to that specific height to open fluid channels between them. Having this channel open may shorten the cleaning cycle even further by cleaning a multi-barrel system in one cycle rather than a cleaning cycle for each barrel.

Those familiar with the art may envision the use of check valves to ensure a direction of flow, such as from a first freezing chamber to a second freezing chamber. Alternatively, multiple channels may be opened by raising the valve stem assemblies to different specific heights. These different channels may further aid in properly cleaning the dispensing units.

Since the system is closed, the pressure may be increased throughout. Applicants have found that pulsing the pressure has been found to push detergents and other cleaning fluids into gaps and seams. However, applicants have found that eliminating gaps and seams produces better results.

In some areas within prior art dispensers, traditional dynamic seals may use an O-ring or an O-ring groove for sealing. Gaps in the O-ring, or between O-rings and fittings may be difficult to clean and may harbor contaminants such as bacteria. Traditionally, these parts including associated O-rings or other seals have been removed for cleaning individually. Applicants have found that a molded in-place seal may be used to provide a seal that may be thoroughly cleaned as described by the processes disclosed and taught herein without removal or disassembly.

In a preferred embodiment, a sealing material is joined and/or manufactured with a fitting. This "over-molded" part may then be assembled within the dispenser. This provides a superior seal that leaves no gaps. The cleaning processes that are disclosed and taught herein have been found to produce desirable results using "over-molded" seals.

Figure 3:
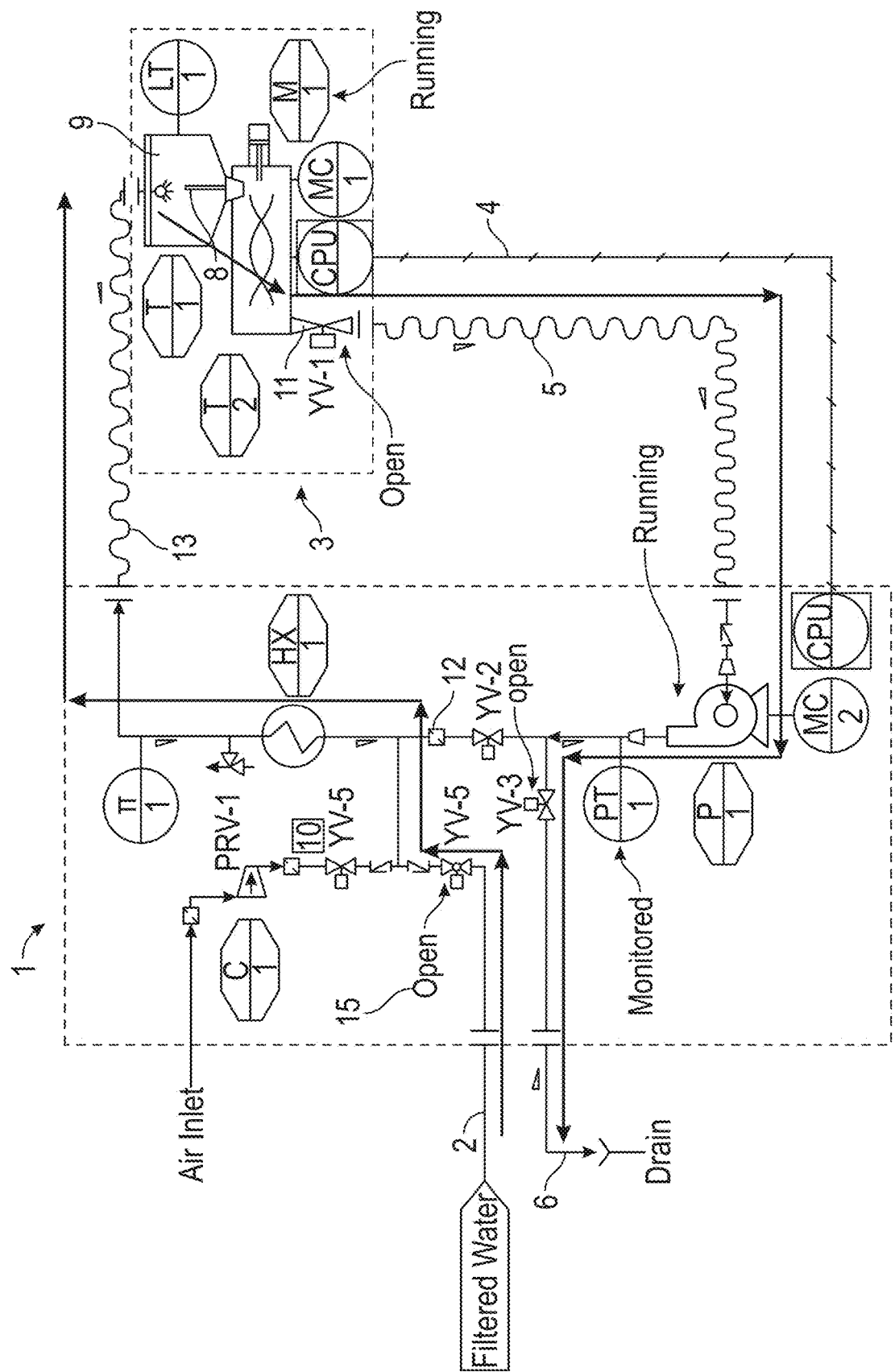
FIGS. 3-6 are exemplary piping and instrumentation diagrams displaying fluid flows in accordance with certain teachings set forth herein.

In a preferred embodiment, the flow of water through the system for Step 1 may be seen in FIG. 3, wherein the bold arrows show the direction of the flow. The indication of direction of the flow of the liquids in the figures is not a limitation of the inventions disclosed and taught herein. In an envisioned embodiment, the pump P-1 may be reversible, or other means may be used to reverse the direction of the flow. This may allow the entire system to be cleaned by filling from the lower points and draining from the upper points of the system. In another envisioned embodiment, a cycle of flushing the system with water may be performed by flowing the water in one direction, then subsequent flows of liquids may have alternating directions through the system. In yet another envisioned embodiment, the pump P-1 may be activated first in one direction, then in another. If this is performed while the system is filled with a liquid, this action may act to agitate the liquids within the system to further promote cleaning.

In one of many embodiments, the cleaning fluids may be first pumped into the hopper. In a preferred embodiment, the hopper will be impinged with the cleaning fluids and cleaned with the mechanical action of the spray from the sprayer. Once contacting the surfaces of the hopper, the resulting falling film will drain into the freezing chamber. In some embodiments it may be preferred to fill the freezing chamber with cleaning fluids, but to not have any appreciable amount of cleaning fluids in the hopper. This may be monitored through the use of sensors within the freezing chamber and hopper. In some prior art dispensers, sensors have been used to ensure that ingredients are maintained at an appropriate level within the hopper. However, applicants have found that those same sensors may be used to detect when cleaning fluids are accumulating within the hopper. Rather than detecting a low level of ingredients, the sensors may be used to detect a high level of cleaning fluids. Once this high level is detected, the processor may take an action or multiple actions to lower the amount of cleaning fluids in the hopper. Some of these actions may include stopping the flow of cleaning fluids to the sprayer, opening the drain from the freezing chamber, activating the beater motor to push air out of the freezing chamber, or other actions that will produce desirable results.

Also during Step 1, motor M-1 may be started to drive the beater or auger in the dispenser 3. Applicants have seen that running the beater or auger of the dispenser 3 cleans and rinses the barrel more quickly and more thoroughly than in tests where it was not run.

Figure 15:
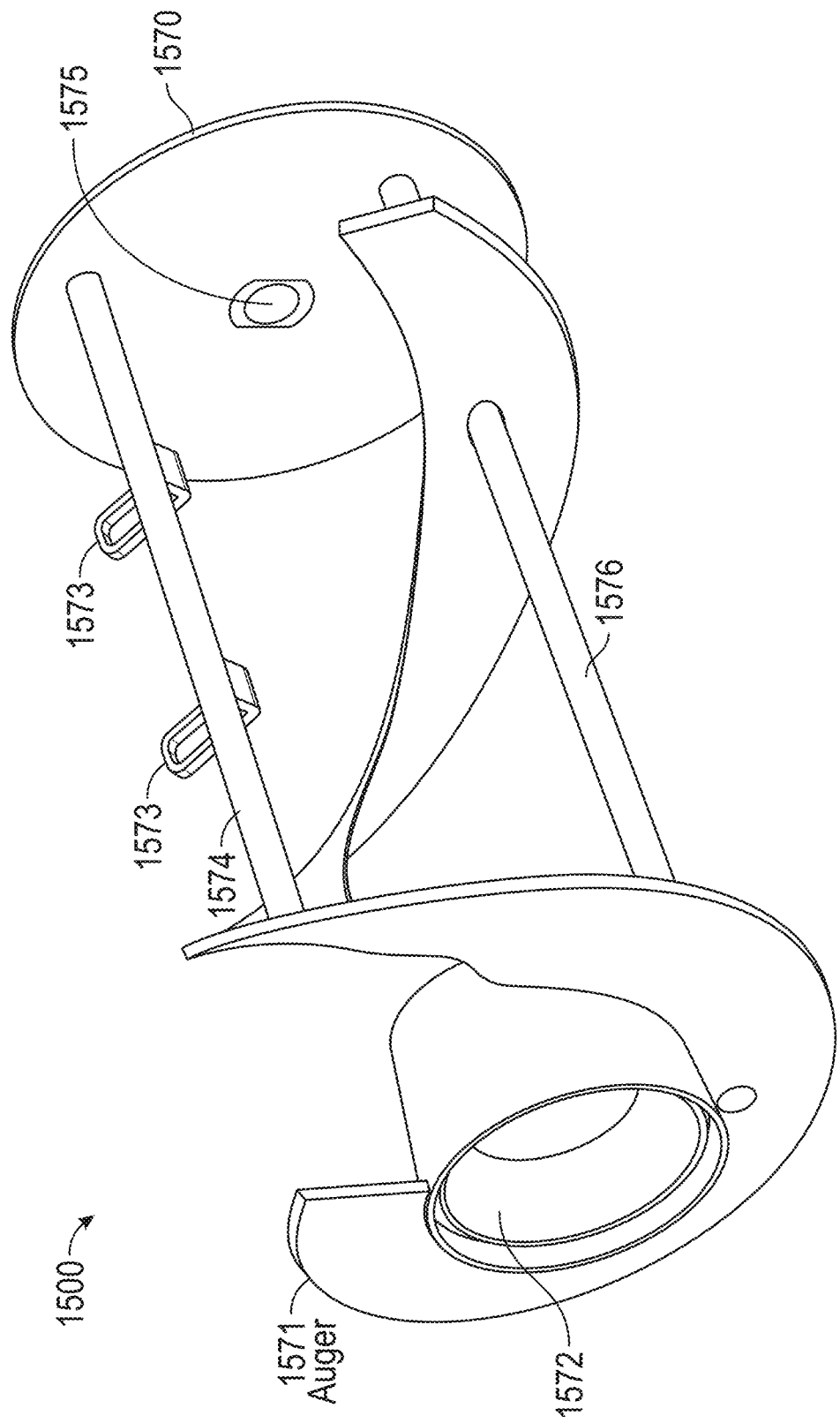
FIG. 15 is a perspective view of a beater bar in accordance with certain teachings set forth herein.

Beater bars in most food dispensers are frequently coupled with tight tolerances to keep product out of gaps. Applicants have found that having tolerances and providing passageways promotes cleaning by allowing cleaning fluids to wash through these areas. An embodiment of a beater bar with auger 1500 in accordance with certain teachings herein is shown in FIG. 15. This does not have a central shaft as is typical in some dispensers, but has a drive opening 1575 in the separation plate 1570, and a core opening 1572. Applicants have achieved desirable results by using stainless steel for the material around the core opening.

FIG. 16 shows an embodiment of a beater bar 1500 with auger in accordance with certain teachings herein. In this exemplary embodiment, a static core 1690 is inserted into the beater bar. The static core 1690 has a bearing surface (not numbered here). The beater bar 1600 has a shoulder (not numbered here) that is configured to prevent the beater bar 1600 from moving past the bearing surface. Also, a scraper 1680 is attached to the bar 1674. The static core 1690 retains the beater bar 1500 in position within the freezing chamber. The static core 1690 does not rotate with the beater bar 1500 but remains stationary and allows the beater bar 1500 to rotate about it on its bearing surfaces. The embodiment shown here is sealed to prevent any contaminants from getting to any inner surfaces. The exemplary design shown here allows the outer surfaces to be cleaned and rinsed thoroughly. In this embodiment, core opening 1572 has perforations along its sides to further promote cleaning.

In an exemplary embodiment, the bearing surfaces of the static core 1690 may be made of a material such as polyoxymethylene (also known as acetal), which has desirable friction properties, and maintains desirable load bearing properties.

Applicants have envisioned an alternative embodiment of a static core where the surfaces are perforated. In this envisioned embodiment, the static core may be perforated in such a manner as to preserve its structural integrity so it may still support a beater bar, but will be open throughout so that cleaning fluids may contact all inner surfaces as well. In this envisioned embodiment, the perforations or openings may be configured to allow proper draining of all fluids. Another embodiment envisioned by the applicants is to have some portions of the static core sealed and some portions that are perforated.

Figure 17:
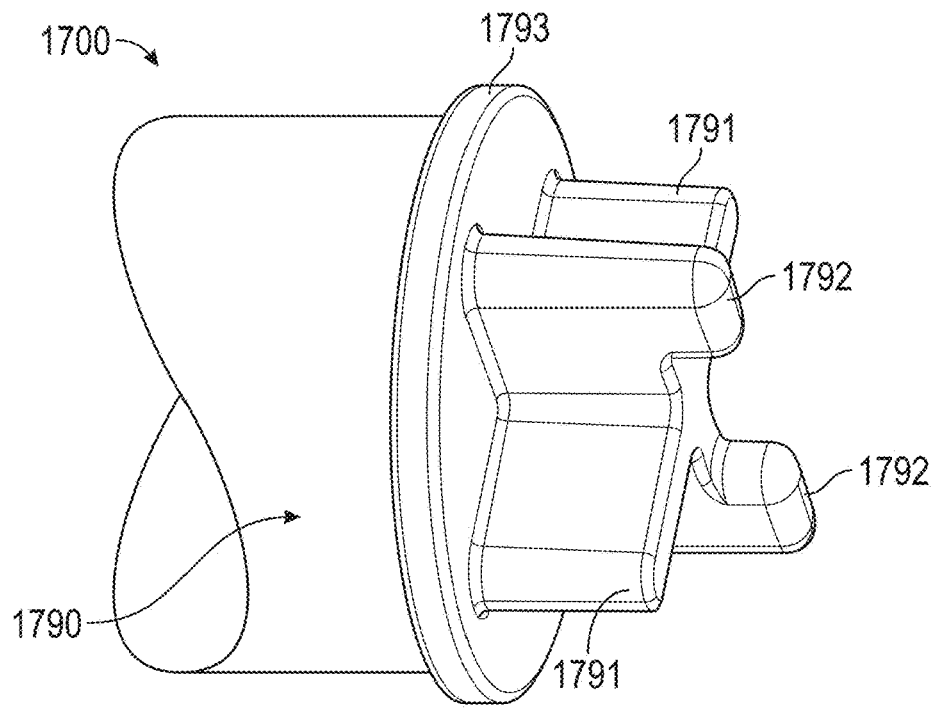
FIG. 17 is a view of one end of a static core in accordance with certain teachings set forth herein.

One end of an exemplary static core 1790 in accordance with certain teachings herein is shown in FIG. 17. This end is configured to couple with the inside of the faceplate. (Not shown in this figure.) Flanges 1791 and keyed flanges 1792 will only couple with the faceplate in certain ways. This will ensure that the static sore 1790 is inserted correctly. Those of ordinary skill in the art will be able to envision alternatives and modifications to this exemplary embodiment without departing from the spirit of the inventions disclosed herein. The bearing surface 1793 may be raised to provide a surface for the beater bar to rest upon and to rotate about. In an envisioned embodiment, bearing surface 1793 may be a ring with an internal raceway for ball bearings. The raceway and bearings may be open and spaced to allow free access of cleaning fluids and to drain properly.

Figure 18A:
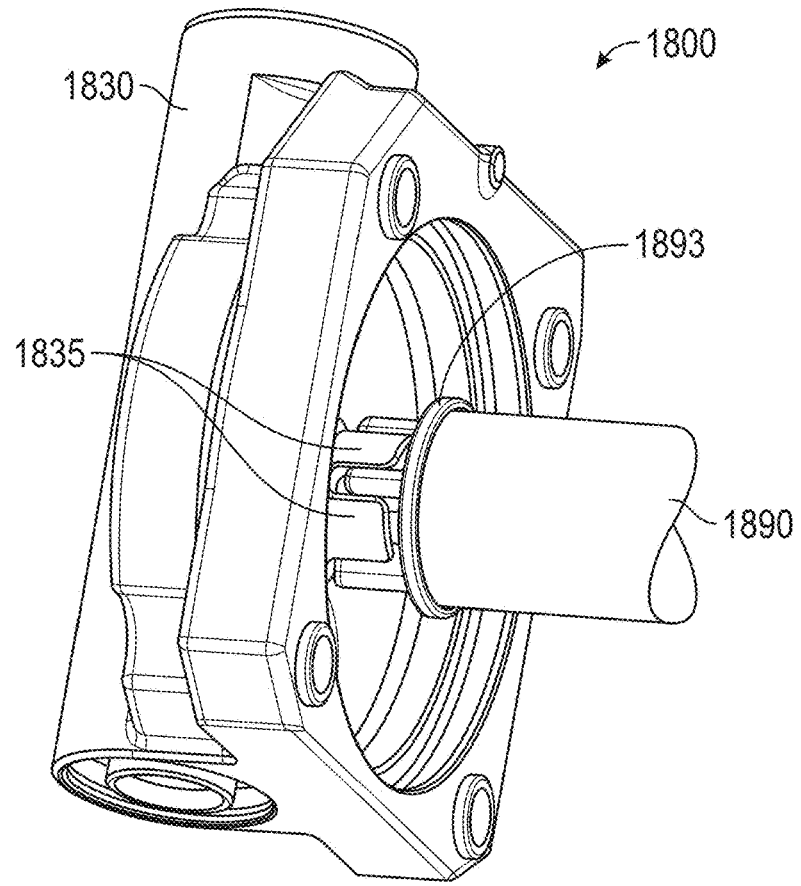
FIG. 18A/B are depictions of a connection between a static core and a faceplate of an exemplary frozen beverage machine in accordance with certain teachings set forth herein.
Figure 18B:
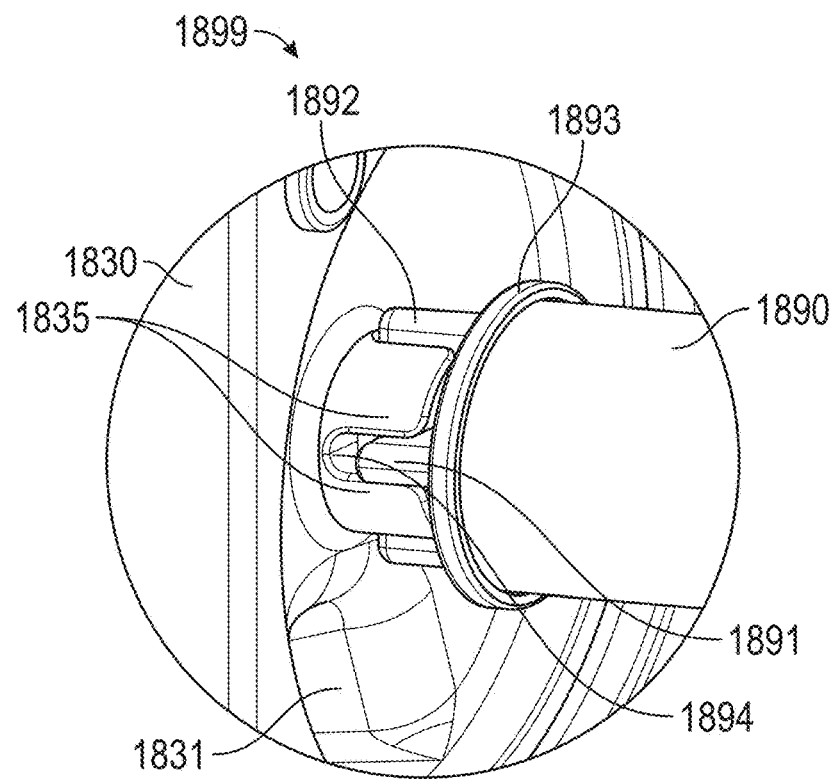

FIGS. 18A and 18B show the exemplary end of a static core 1890 coupled with a faceplate 1830. Projections 1835 are raised from the surface of the faceplate 1830 and configured to couple with the flanges 1891 and keyed flanges 1892. In this exemplary embodiment, the projections 1835 each have the same dimensions. For example, each projection 1835 extends the same distance from the inner surface of the faceplate 1830. Also in this exemplary embodiment, the projections 1835 are spaced equally apart in that they are spaced the same distance from a center (not numbered). In this exemplary embodiment, the distance from the center to the outsides of the projections 1835 is less than the distance from the center of the static core 1890 to the outer edges of the flanges 1891 and keyed flanges 1892. The bearing surface 1893 is at a distance still further out from the center. In this way, the core opening 1572 of a beater bar 1500 will not contact the inner surface of the faceplate 1830, since the shoulder of the beater bar is restricted by the bearing surface 1893 of the static core 1890.

There are tolerances between the projections 1835 and the flanges 1891 and keyed flanges 1892. These overall gaps between these structures are small enough to not interfere with the normal operations of the dispensing machine, but are such that they allow cleaning fluids to reach the areas between surfaces.

As may be seen in FIGS. 18A and 18B, the extension of the flanges 1891 does not reach the keyway 1894 between the projections 1835. This configuration produces a flow channel for cleaning fluids to move through. Applicants have found that while the lengths of the projections 1835 and the lengths of the keyed flanges 1892 may be the same, the overall length of the static core 1890 should be such that a gap may remain in this coupling. This gap will open and close during washing and rinsing as the beater bar 1890 is rotated in different directions. To facilitate opening the gap, angled grooves may be embossed or cut on the outer surface of bearing surface 1893 and/or onto the inner surface of the core opening 1572. When the motor turns the beater bar 1500, the grooves will draw the static core 1890 in a direction consistent with the direction of the angles.

In another envisioned embodiment, a spring or clip may be configured between the static core 1890 and the area between the projections 1835. This may bias the static core 1890 away from the faceplate 1830 at all times. This bias may be slight to still allow the static core 1890 to move towards the faceplate 1830 at times. Without this movement surfaces may remain in contact with each other during the wash cycle, preventing cleaning fluids from reaching surfaces that need to be cleaned.

In another envisioned embodiment, they keyways 1894 may be configured to allow the static core 1890 to be inserted and retained in limited orientations. This may be desirable if the static core has perforations and a specific orientation is needed for proper washing and draining. While the static core described and taught in this disclosure is embodied as having a circular cross-section, applicants envision other embodiments where the cross-section is not circular. Such embodiments may include ovals, rhomboids, and other polygonal shapes. These embodiments may further facilitate draining of fluids at more desirable rates. Also, while the inventions taught within this disclosure are exemplified in a frozen beverage machine in which the freezing chamber is enclosed, the inventions may still be applied to other types of beverage dispensers. A specific orientation of a static core 1890 may be desirable if a logo or some other mark is to be displayed on the sides of a static core in a dispenser having transparent sides or a transparent faceplate.

Figure 19:
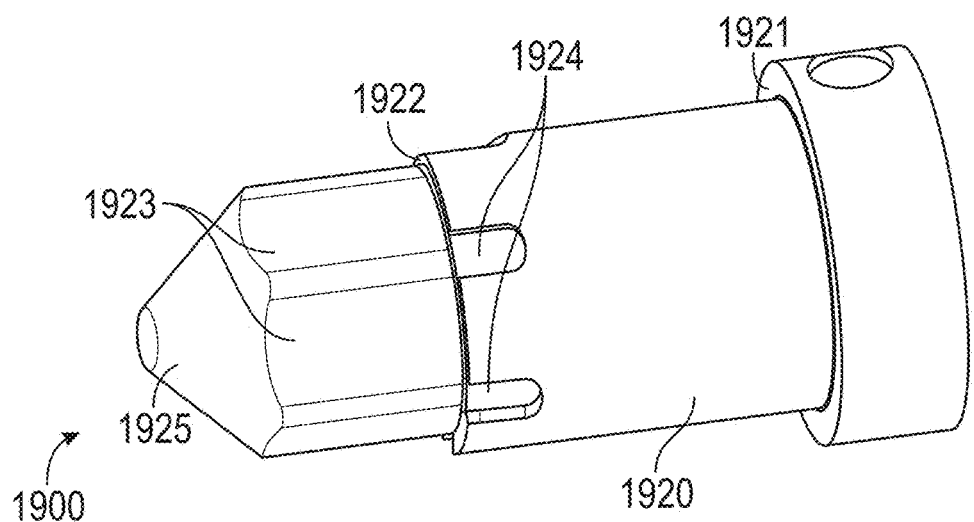
FIG. 19 is a view of motor coupler in accordance with certain teachings set forth herein.

In some prior art dispensers, an auger inside the freezing barrel may be attached to a drive shaft connected to a motor. FIG. 19 shows an embodiment of a motor coupler 1920 as taught in this disclosure. Couplings between the augers and the drive shafts of prior art dispensers were usually tightly mated and required removal of the auger to clean the interstices. However, the design taught in this disclosure provides tolerances between drive elements and flow channels that promote thorough cleaning.

Motor coupler 1920 is configured to securely mate to the drive shaft at one end and to engage the auger at the other end. A collar with shoulder 1921 may be located behind a seal of the rear wall of a freezing chamber (not shown) and secured through means known to those skilled in the art. Such means may include, but are not limited to, the use of drive shaft keyways, set screws and other applications. The front of the motor coupler 1921 will then project into the freezing chamber. This exemplary embodiment of a motor coupler 1920 has drive surfaces, 1923, flow channels 1924, and a tapered nose 1925. Applicants have found that making the motor coupler 1920 from stainless steel produces desirable results. Those familiar with the art may envision other materials being used for this and other items described herein without departing from the spirit of the inventions disclosed and taught herein.

Figure 20B:
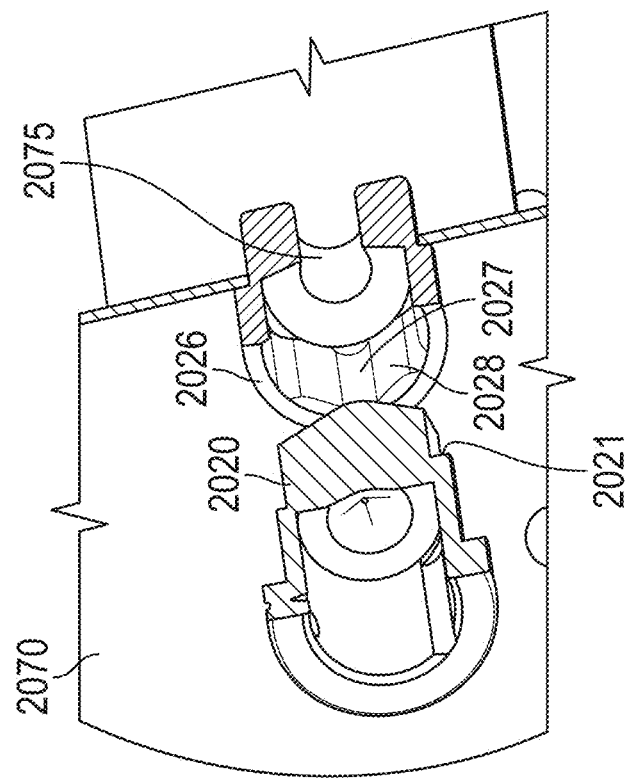
FIG. 20A/B are views of a motor coupler in association with a beater bar in accordance with certain teachings set forth herein.
Figure 20A:
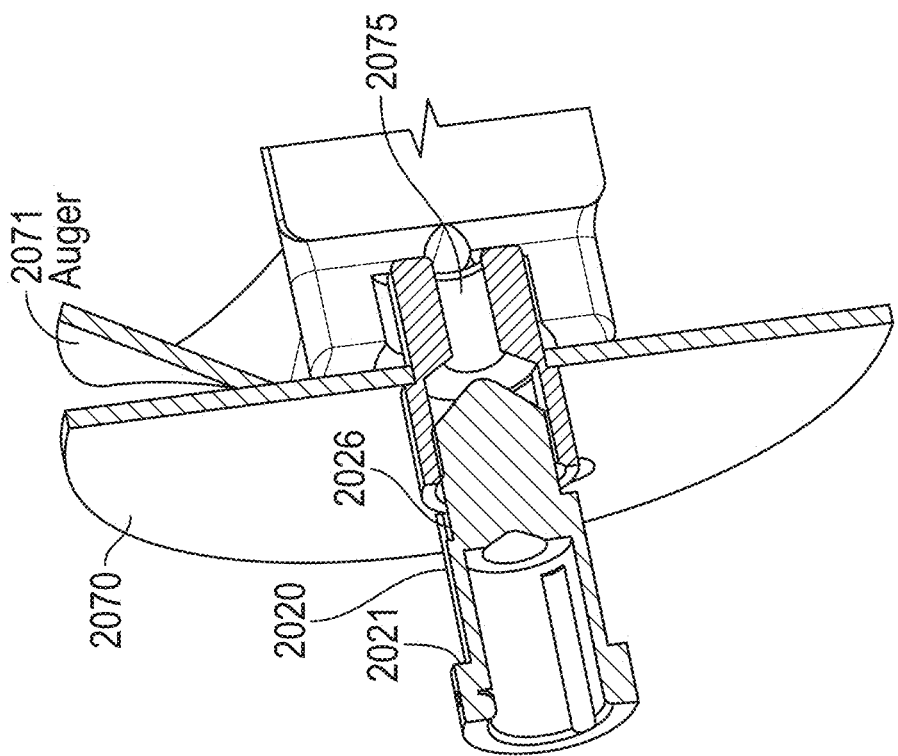

FIGS. 20A and 20B show an embodiment of a motor coupler 2020 in accordance with certain teachings herein. In FIG. 20A, the motor coupler 2020 is inserted into the key driveway 2075. It may be seen here that the seating shoulder 2022 is in contact with the stop shoulder 2026 of the key driveway 2075. FIG. 20B shows the motor coupler 2020 retracted from the key driveway 2075. This shows that they key driveway 2075 has auger drive surfaces 2028 that are configured to contact the drive surfaces 2023 of the motor coupler 2020 when the motor is turning. Between these auger drive surfaces 2028 are drive keyway flow channels 2027. These drive keyway flow channels 2027 are configured to match with the motor coupler flow channels 2024 to allow cleaning fluids to wash through. If sufficient tolerance is left between the drive surfaces 2023 and the auger drive surfaces 2028, then the cleaning fluids may contact those surfaces as the motor is driven forward and backward during a wash cycle.

In an envisioned embodiment the drive surfaces 2023 and/or the auger drive surfaces 2028 may be knurled or otherwise provided with surfaces that allow cleaning fluids to wash over and through them.

In any of the embodiments that may be envisioned by one of ordinary skill as taught by the disclosures herein, when a cleaning fluid enters from behind the separation plate 2070, the fluid may have a channel through the motor coupler flow channels 2024, through the auger flow channels 2027 and through the drive keyway 2075 to wash away product and contaminants. In the reverse, if a cleaning fluid is injected from in front of the separation plate 2070, the fluid will have the reverse channel to wash and clean. Rocking the motor back and forth will allow the cleaning fluid to contact, clean, and wash the drive surfaces 2023, 2028.

Turning now to FIGS. 21 through 26, scrapers may be used in some dispensers and the inventions taught herein will be disclosed. It is sometimes desirable to have a scraper associated with a beater bar and auger in some dispensers. This may be beneficial in scraping frozen beverage or food away from the barrel of a dispenser which may be surrounded by a heat exchanger to provide a more consistent product.

Figure 21:
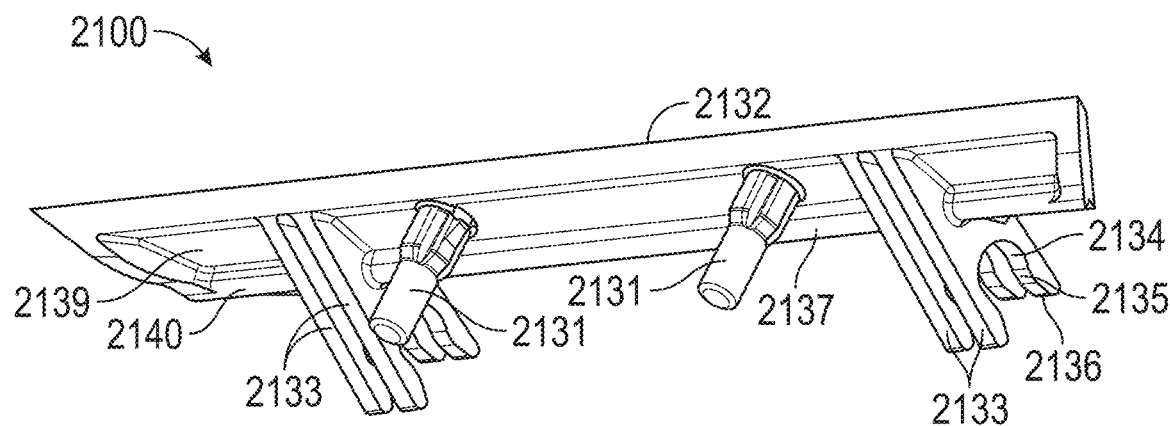
FIG. 21 is a view of a scraper in accordance with certain teaching set forth herein.

FIG. 21 shows an embodiment of scraper in accordance with certain teachings herein. A scraper 2100 may have a leading edge 2132 and a trailing edge 2134. Generally known in the art are ways that scrapers may be attached to a beater bar. In this exemplary embodiment, applicants have found mechanisms for attaching a scraper to a beater bar that may also be cleaned through the methods and apparatuses disclosed and taught herein.

As with most scrapers 2100, the exemplary scraper shown herein has a leading edge 2132 and a trailing edge 2137. It has clamps 2133 arranged along its length. While the exemplary embodiment in FIG. 21 shows four clamps 2133 arranged in pairs, other arrangements may be envisioned and utilized without departing from the inventive spirit as disclosed herein. Each clamp 2133 has an opening comprising a clamping area 2134, an extension area 2135, and a clamp end 2136. One end of the clamp 2133 then attaches to the base 2239 of the scraper, and may also attach to a support bar 2140, which may be integral with the base 2239.

In attaching the scraper 2100 to a beater bar, the clamping area is configured to be of a slightly larger diameter than that of the hanger bar (not shown in this figure), and extends over half of the circumference of the hanger bar. The distance between the extension areas 2135 of a single clamp 2133 is therefore just under the diameter of the hanger bar to which it is to be attached. The clamp ends 2136 are configured to slope outwards and to have a final distance of just more than the diameter of the hanger bar to which it is to be attached. In this way, an operator may position the scraper 2100 onto a beater bar and press it so that the extension areas 2135 will slightly separate to allow the passage of the hanger bar. When the bar is in position, the extension areas 2135 will snap back into place, retaining the hanger bar against the clamp area 2134, but with a small gap around the hanger bar. Applicants have found that a gap of 0.007 inches to 0.008 inches with a tolerance of 0.001 inches around the hanger bar provides desirable results.

Satisfactory results have been found by using clamps 2133 with clamp areas 2134 that are 0.020 inches from the bar. Envisioned embodiments include having clamping areas that present a single, edge towards the bar (much like a knife-edge around the hanger bar), or clamping areas that are cut, grooved, or knurled to present minimum contact with the bar.

The exemplary embodiment of the scraper 2100 shown in FIG. 21 also has pins 2131, which are used to maintain a bias so the leading edge 2132 consistently presses against the inner surface of the freezing chamber (not shown). A detail view of a pin 2131 may be seen in FIG. 22.

Figure 22:
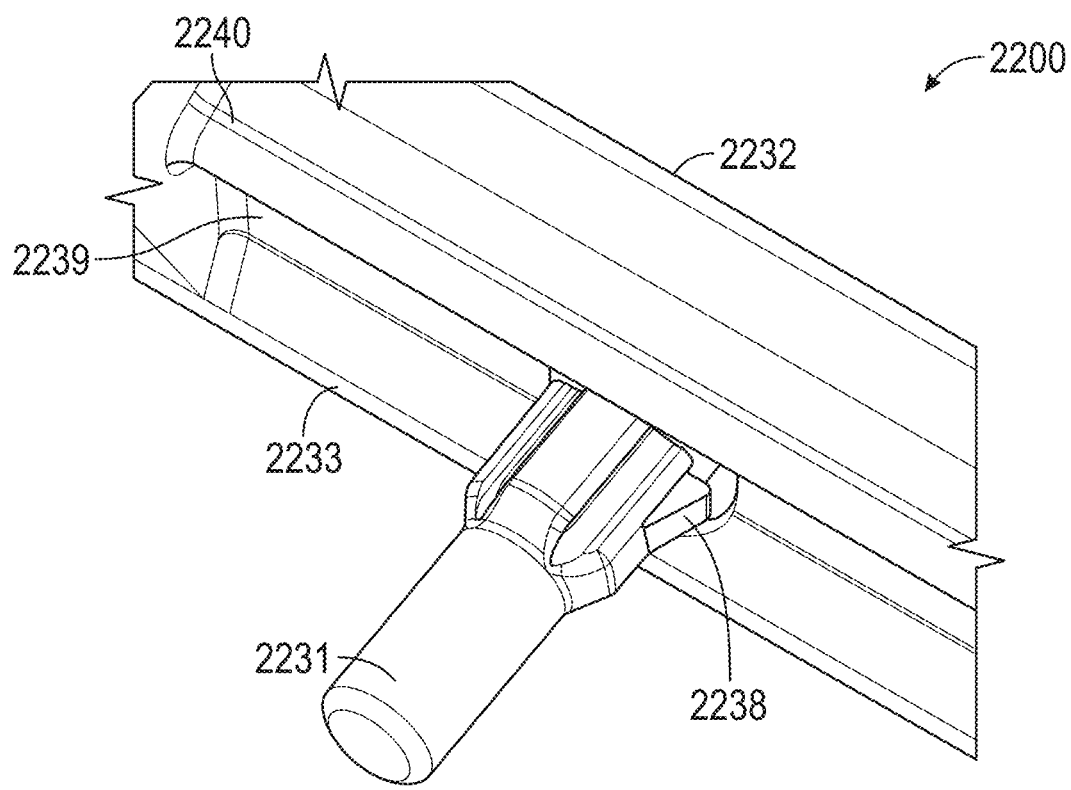
FIG. 22 is a view of a spring capture feature on a scraper in accordance with certain teachings set forth herein.

FIG. 22 shows a pin 2231 with a spring capture feature 2238. One end of the pin 2231 attaches to the base 2239. While the pin 2239 may also attach to the support bar 2240, applicants have found good results having a flat surface around the base of the pin. This exemplary embodiment of a pin 2231 shows shoulders around a portion of the pin 2231 nearest the base 2239. These may be added if additional support is desired to ward off any possible separation or tearing resulting from fatigue.

Figure 23:
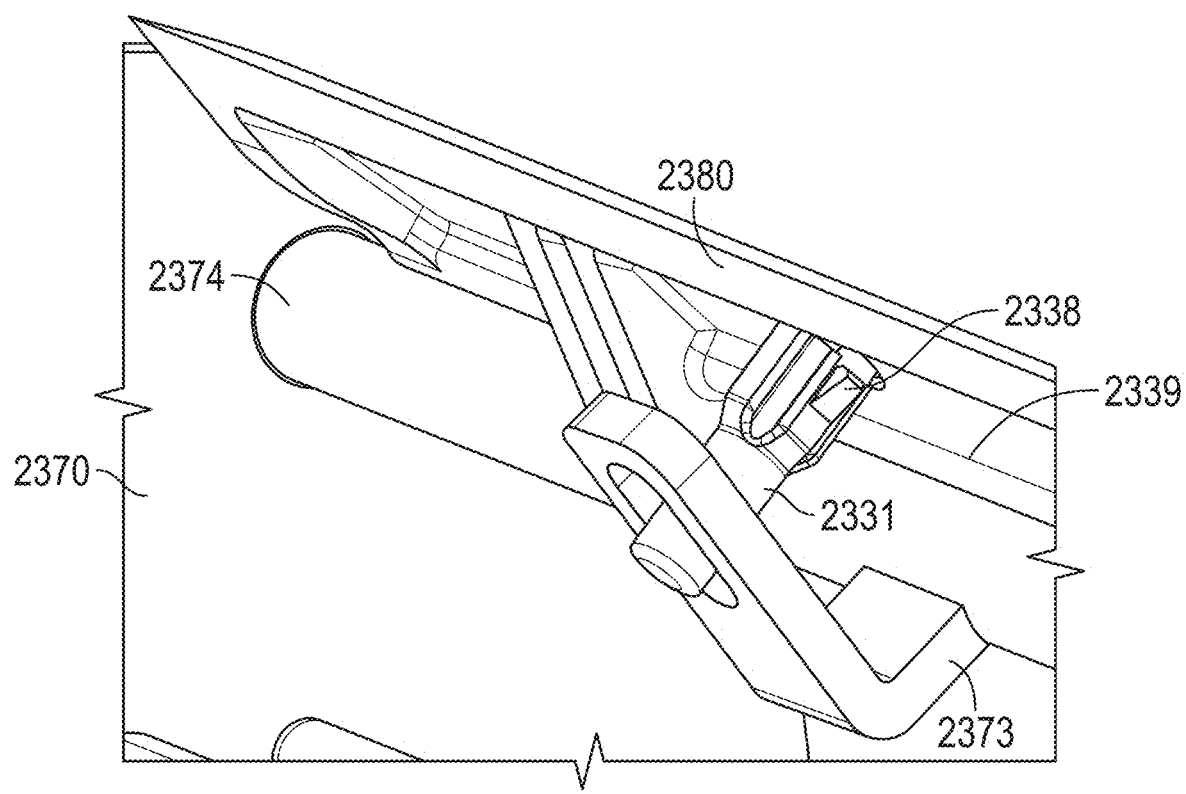
FIG. 23 is a view of a scraper in association with a beater bar in accordance with certain teachings set forth herein.

FIG. 23 is an exemplary scraper 2380 positioned on a beater bar. As noted, the scraper 2380 may be attached to the hanger bar 2374. When done in the manner taught within this disclosure, the scraper may have some degree of rotation about the hanger bar 2374. The scraper may then be positioned so that the pin 2331 is insertable into an opening of a clip 2373, which is attached to the hanger bar 2374. The shoulders of the pin 2331 may extend outwardly so that they do not pass through the opening in the clip 2373.

A spring (not shown in this figure) may be placed such that one end may press against a surface of the clip 2373, and the other end may press against the base 2339. In this way, a bias may be placed upon the scraper 2380 such that its leading edge 2332 may press against the inner surface of the freezing barrel.

Applicants have found that the life expectancy of a spring that may be used in this exemplary dispenser is such it should last without any degradation, or break. However unlikely as may be, it is very undesirable that a spring should break or become separated from its attachment and be dispensed with a product. To that end, applicants have devised a spring capture feature 2338. An exemplary spring capture feature 2338 as shown in FIGS. 22 and 23 may be wedge-shaped such that they extend away from the pin 2331, tapering outwards at an area closest to the scraper base 2339. A line from the opposite side of the pin to a point of the spring capture feature 2338 furthest from the pin may be just slightly larger than the diameter of a spring.

Figure 24:
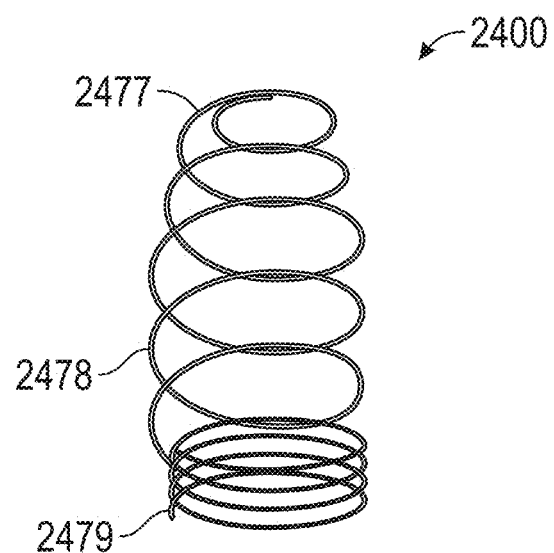
FIG. 24 is a view of a spring in accordance with certain teachings set forth herein.

A spring 2400, as may be seen in FIG. 24, may then be placed around the pin 2331 and retained by the spring capture feature 2338. An exemplary spring 2400 may be a compression spring of normal taper, or may have a barrel shape, or be tapered in one direction or the other. A spring 2400 may have a variable pitch such that lower spring end 2479 has little separation between coils. In this way, a number of coils may be placed under the spring capture feature 2338. In this way, the spring 2400 may still provide a bias against the clip 2373 but will be retained by the spring capture feature 2338 if the scraper 2380 separates from the hanger bar 2374.

Some health regulations require that individual coils of a spring not touch each other if they are to be used in a clean-in-place apparatus. That is to say that the ends may not be ground. Some regulations require a distance measured in a number of diameters of the spring wire itself as a separation distance, such as the spring coils must be at least three wire diameters from each other. The spring capture feature 2238, 2338 may be used with springs of that nature as well.

A spring with a variable pitch may be used where the pitch is tighter at the end to be placed under the spring capture feature 2238, 2338. This narrowing will still hold the spring in place as a bias will be placed on the spring towards the larger openings of the spring coils and away from the narrowing of the spring coils. As an example, the portion 2479 of spring 2400 may have a separation of three spring wire diameters at that end, and a separation of ten to twenty spring diameters at portion 2478. This variable pitch will retain the spring to the pin 2131 2231 even without a force being applied from above, such as from the clip 2373.

FIGS. 29 through 32A/B depict an exemplary dual-torsion spring that may be used to retain and outwardly bias a scraper to a beater bar. These figures also depict an exemplary configuration of scraper clamps and a hanger bar in accordance with certain teachings set forth herein.

Figure 29:
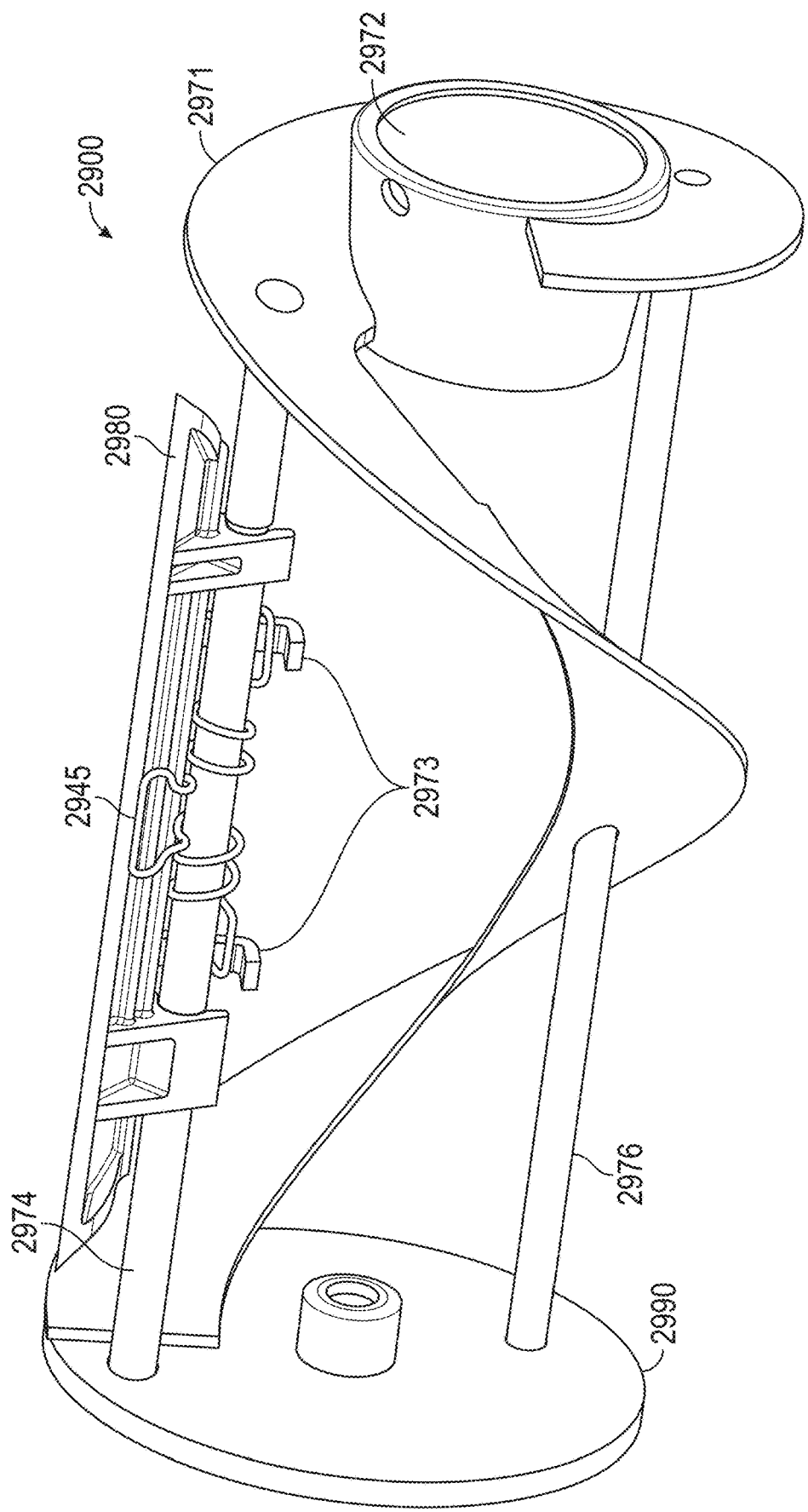
FIG. 29 is a beater bar with attached scraper in accordance with certain teachings set forth herein.

Turning first to FIG. 29, exemplary dual-torsion spring 2945 is shown wrapped around the hanger bar 2974 and pushing the scraper 2980 outward, away from the center of the axial center of the auger 2971 by pressing against clips 2973.

Figure 30A:
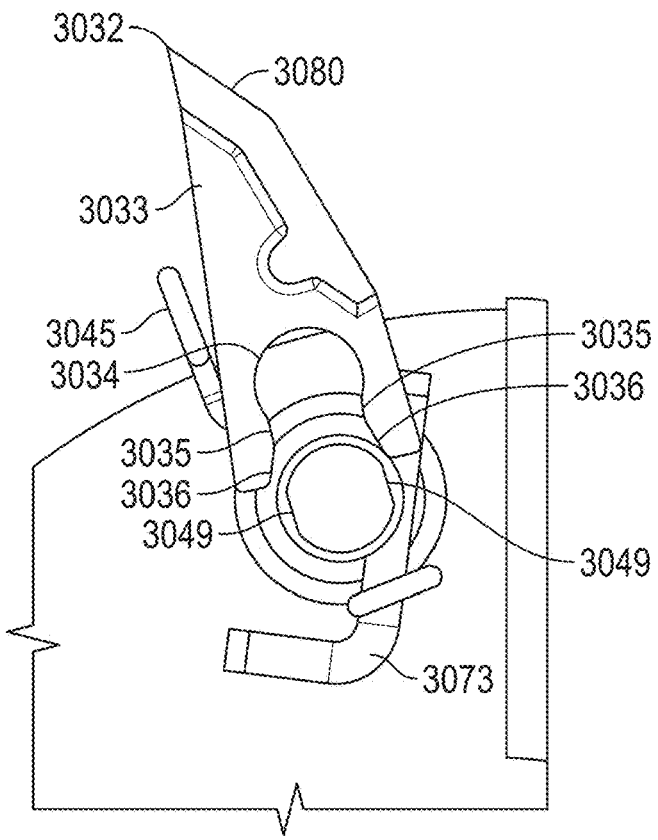
FIG. 30A/B show a scraper and hanger bar in relation to an auger in accordance with certain teachings set forth herein.

FIG. 30A/B show a closer view of how the exemplary dual-torsion spring 3045 is attached to the clip 3073 and wound around the hanger bar 3074. FIG. 30A shows the exemplary dual-torsion spring 3045 in a relaxed state. When the scraper 3080 is attached to the hanger bar 3074 and inserted into a freezing chamber of an exemplary dispenser, the scraper 3080 will be pulled back, tensioning the dual-torsion spring 3045. This bias may be used to keep the leading edge 3032 of the scraper 3080 pressed against the inside of the freezing chamber.

The spring may be made of any material suitable for use in a dispenser and having spring-like properties. Having the dual-torsion spring wind around the clips 2973 in FIG. 29 may provide an additional advantage of ensuring that if the dual-torsion spring 2945 does break during operation, its pieces will be retained to the hanger bar 2974 and will not be dispensed. For example, if the dual-torsion spring 2945 breaks at an area where it contacts the scraper 2980, is each piece will continue to apply pressure on the scraper 2980 and will continue to be retained on the hanger bar 2974. If the dual-torsion spring 2945 breaks at a different location, the piece that still contacts the scraper 2980 will continue to provide an outward bias and will maintain the operation of the dispenser. The other, shorter piece will not fall off of the hanger bar 2974 because of the double windings around the hanger bar 2974, and a retention to the clip 2973. This may be seen in better detail in FIG. 32B, where the ends of dual-torsion spring 3245 bend around the clips 3173.

Figure 25A:
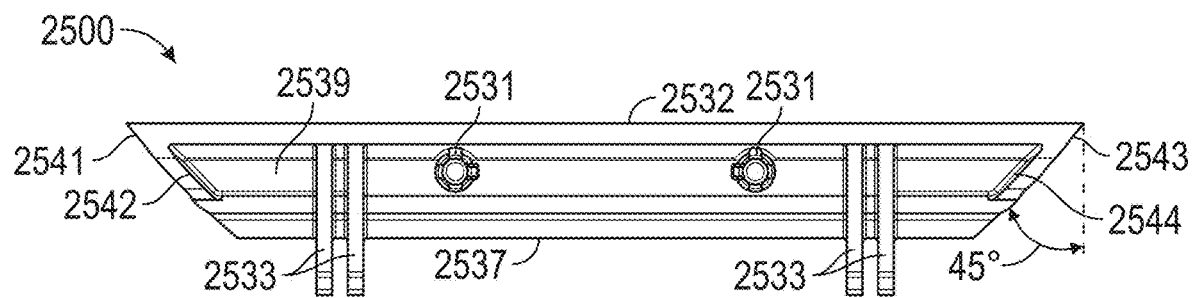
FIG. 25A/B are a view of a scraper in accordance with certain teachings set forth herein.
Figure 25B:
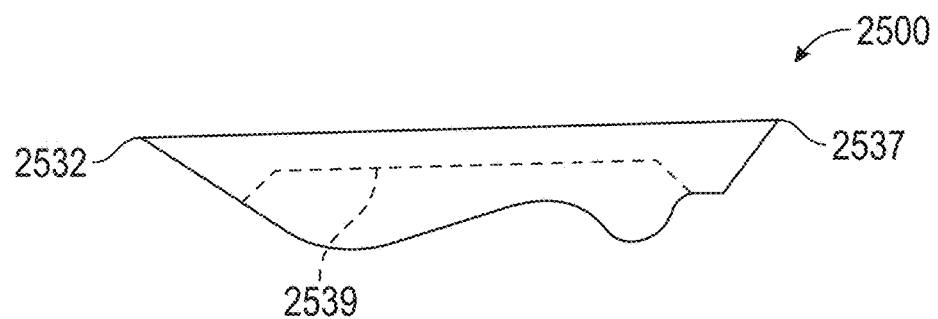
Figure 26:
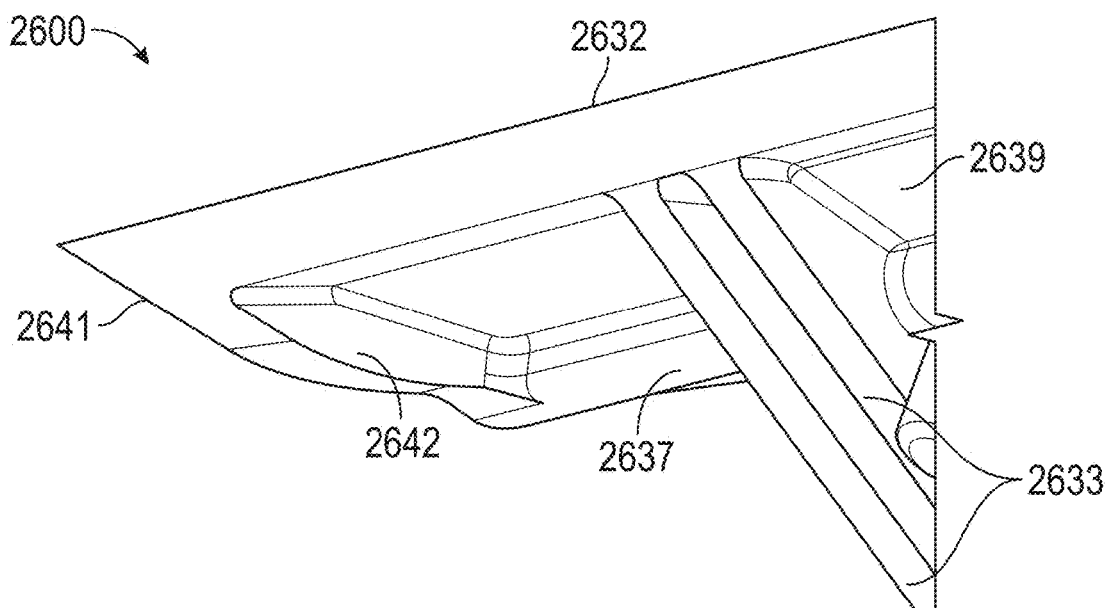
FIG. 26 is a view of a section of a scraper blade and strengthening gusset and flow diverter/straightener in accordance with certain teachings set forth herein.

Turning now to FIGS. 25 and 26, an embodiment of a scraper 2500, 2600 in accordance with certain teachings contained herein may be seen. This embodiment of a scraper 2500, 2600 may be positioned as depicted in FIG. 16 on a hanger bar 1674. However, applicants have found there may be advantages to having multiple scrapers in a dispenser in some cases. In some situations, this may be desirable for dispensers with large diameter freezing barrels where scraping the frozen product from the sides of the freezing barrel may need to be performed more often than once per rotation of the beater bar and auger 1600. Applicants have found that additional scrapers may be placed on additional hanger bars, or on portions of the auger bar 1676.

Applicants have found that scrapers of minimum volumes are desirable in dispensers. Smaller volumes of the beater bar, auger, scrapers, and other gear inside the freezing barrel allows for greater volumes of product available to be sold to customers. Therefore, it is desirable to make the scrapers as dimensionally small as possible. Additionally, the refrigeration system should be chilling the ingredients to make product, and do not need to be expending efficiency in cooling the gear inside the freezing chamber.

Applicants have designed scrapers having desirable characteristics. The exemplary embodiments of scrapers 2500, 2600 have desirable dimensions and may be made of materials that are efficiently cooled.

Exemplary scraper 2500 has a leading edge 2532 and left and right sides 2541, 2543. Those ordinarily skilled in the art may be inclined to have the sides perpendicular to the leading and edges, creating a rectangular shape. Applicants have found that angling the sides 2541, 2543 inwards towards the trailing edge produces a desirable scraper. Angles of between 10° and 80° may be used. Good results have been found using angles of between 30° and 60, with a preferred embodiment using an angle of 45°.

While the front edge 2532 of exemplary scraper 2500 has a taper, the remainder of the profile of the scraper 2500 does not need to conform to a wedge shape, but may have a variable profile towards the trailing edge 2537. This may be seen in the profile view 25B. The scraper 2500 has a scraper base 2539 that is thinner than the profile of the scraper 2500 at its sides 2541, 2543. The dashed lines in FIG. 25B show the thinner base 2539 as compared to the profile. While having this thinness across the entire length of the scraper 2500 is desirable, strengthening gussets 2542, 2544 maintain a desired rigidity of the scraper 2500.

While the strengthening gussets 2542, 2544 may provide strength and support by only following the profile of the sides 2541, 2543 of the scraper 2500, Applicants have found that by elevating the projection, the strengthening gussets 2541, 2543 will also act to straighten, divert, and further mix the flow of product as the scraper rotates within the freezing chamber. Desirable results have been found by having the strengthening gussets 2542, 2544 reach an elevation of 0.1 inches above the profile of the interior side of the scraper with a tolerance of +/−0.015 inches. An exemplary rib (not marked) extending along the length of the scraper may be seen in the profile view of FIG. 25B. This rib may extend 0.150 inches with a tolerance of +/−0.015 inchs above the flat portion of the scraper. This exemplary rib may also provide strengthening of the scraper.

In another aspect, the strengthening gussets to not need to be mirroredly oriented. In FIG. 25A, the strengthening gussets 2542, 2544 direct the product towards the middle of the scraper 2500. In an envisioned embodiment, both strengthening gussets may be oriented to push the product in the same direction as the auger is pushing the product. Alternatively, the strengthening gussets may be oriented to push the product counter to the direction that the auger is pushing the product.

While FIGS. 25 and 26 show the projection of the strengthening gussets 2542, 2544 as being perpendicular from the surface of the scraper 2500, other angles may be used. Cambering the projections inwardly towards the middle of the scraper 2500, or outwardly away from the middle of the scraper may produce other desirable effects.

The strengthening gussets are not limited to being positioned at the sides 2541, 2543 of the scraper 2500. In some embodiments, they may be at the sides, and at various positions towards the middle of the scraper 2500. In other embodiments, there may not be any strengthening gussets at the sides, but one or more positioned more closely to the middle of the scraper. Strengthening gussets may also be associated with clamps along the length of the scraper.

In some situations, it may be desirable to have the pins 2531 attached to the base 2539, as well as a thicker portion. Attaching the pins 2531 to a thicker portion such as a rib along the length of the scraper may be seen in FIG. 25A.

FIG. 30A/B shows an exemplary way of attaching the scraper 3080 to hanger bar 3074. In this exemplary embodiment, some portions of the surfaces of the hanger bar 3074 have been shaped to provide flats 3049. These flats 3049 are parallel to each other and sized to cooperate with the clamps 3033. In one embodiment, the distance between the extension areas 3035 may be very the same or slightly larger than the distance between the flats 3049. This will allow the scraper 3080 to fit on the hanger bar 3074 with little effort. In another embodiment, the distance between the extension areas 3035 may be slightly smaller than the distance between the flats 3049, requiring a force to elastically extend them while the extension areas 3035 are being pushed across the flats 3049. The elastic deformation of the clamps 3033 will be relieved when the flats 3049 pass all of the way across the extension areas. Other embodiments may be readily envisioned without departing from the spirit of the inventions disclosed herein by those sufficiently skilled in the art, As described elsewhere, once the hanger bar 3074 is centered within the clamping area 3034, it may be rotated. In one embodiment, the flats 3049 may be generally aligned radially, outward from the axial center of the auger. From that, once the scraper 3080 is rotated so the auger may be inserted into a freezing chamber, the flats 3049 will no longer be in alignment with the extension area 3035. This will further retain the scraper 3080 to the hanger bar 3074.

As noted elsewhere, the clamping area 3034 may be a loose fit around the hanger bar 3074 to allow cleaning fluids to wash through the gaps. The gaps and places of contact may change as the motor driving the auger is reversed and/or quickly started and stopped during cleaning and rinsing cycles. On the other hand, it may be of a tight fit to prevent any food product from getting into any gap. In another envisioned embodiment, the clamps may be provided with over-molded seals for a close contact with the hanger bar.

Referring back to FIG. 15, the exemplary hanger bar 1574 depicted there may be of a uniform diameter throughout its length. In FIG. 16, the scraper 1680 is retained from moving laterally along the length of the hanger bar 1674 by having the pins on the scraper 1680 inserted into the slots of the clips. This may be viewed in FIG. 23 as well. As may be seen in FIG. 30A/B, 31 and 32A/B, Applicants have invented a new method of retaining scrapers that also ensures positioning and correct placement.

Figure 31:
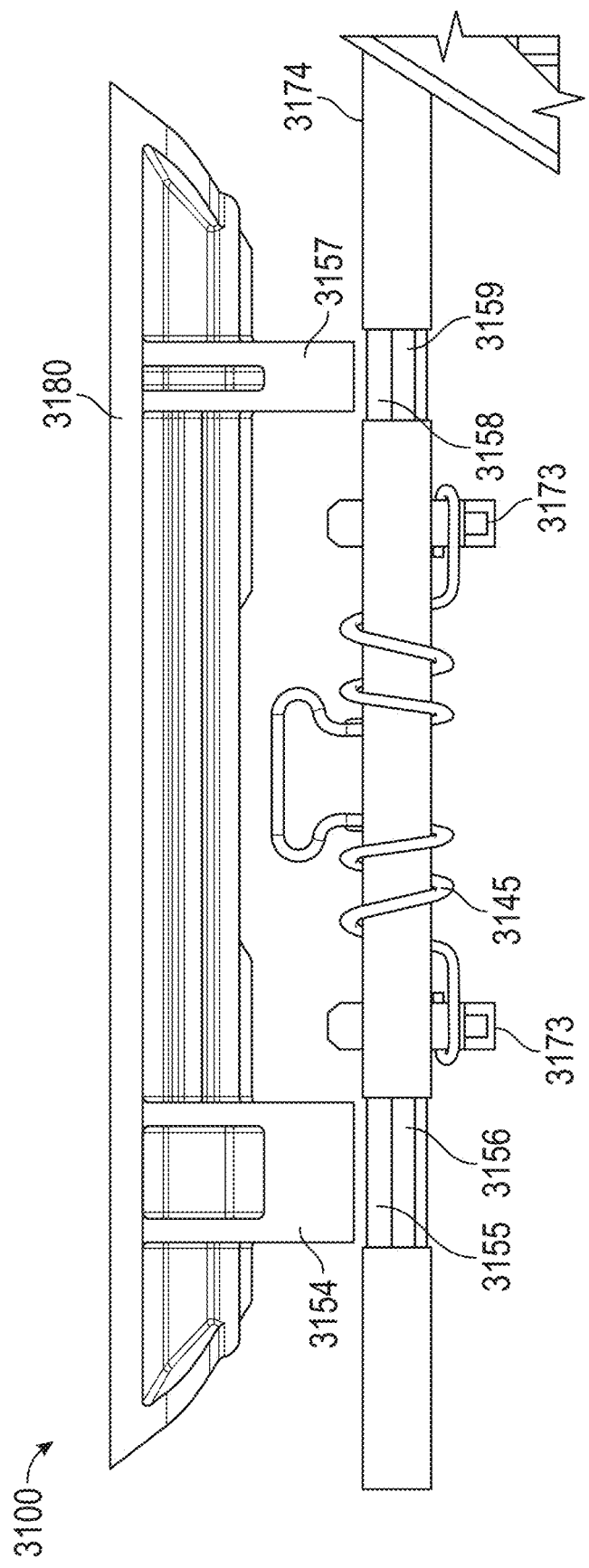
FIG. 31 shows a scraper, a hanger bar, and a spring in accordance with certain teachings set forth herein.

FIG. 31 shows an exemplary embodiment of a scraper 3180 and a hanger bar 3174 as described herein. The scraper 3180 has a left recess 3155 and a right recess 3158. The recesses 3155, 3158 may be generally round and have flats 3156, 3159 as described in FIG. 30A/B. As may be noted, the left clamp 3154 may be a different width than the right clamp 3157. Similarly, the left recess 3155 may be of a different width than the right recess 3158, wherein each recess 3155, 3158 may match the width of the corresponding clamp 3154, 3157. This arrangement may be used to prevent the scraper 3180 from being mounted backwards. This arrangement may also prevent lateral movement as the sides of the recesses 3155, 3158 will stop side-to-side movement of the clamps 3154, 3157.

Figure 30B:
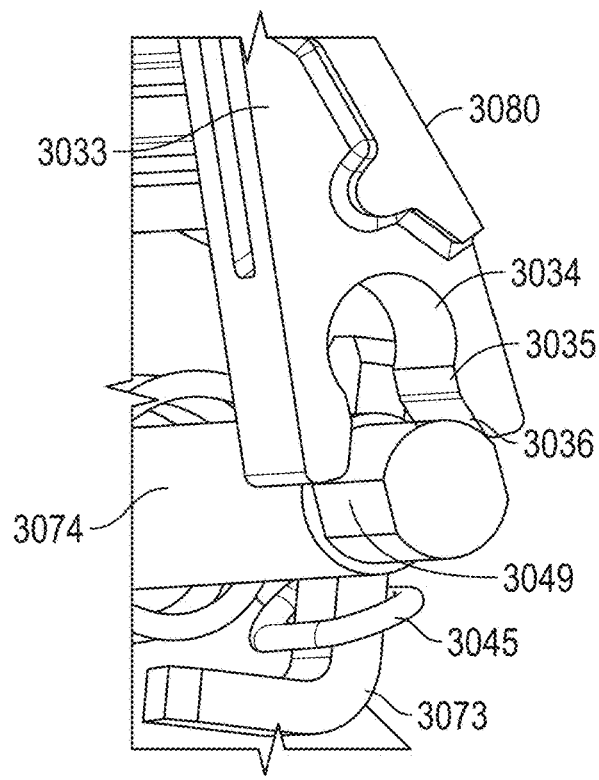

In the exemplary embodiment of FIG. 30, the recesses 3155, 3158 are shown to be of similar diameters. While it may be convenient in the manufacturing process to machine the recesses 3155, 3158 to the same diameter, Applicants envision embodiments where those diameters may not be the same.

Figure 32A:
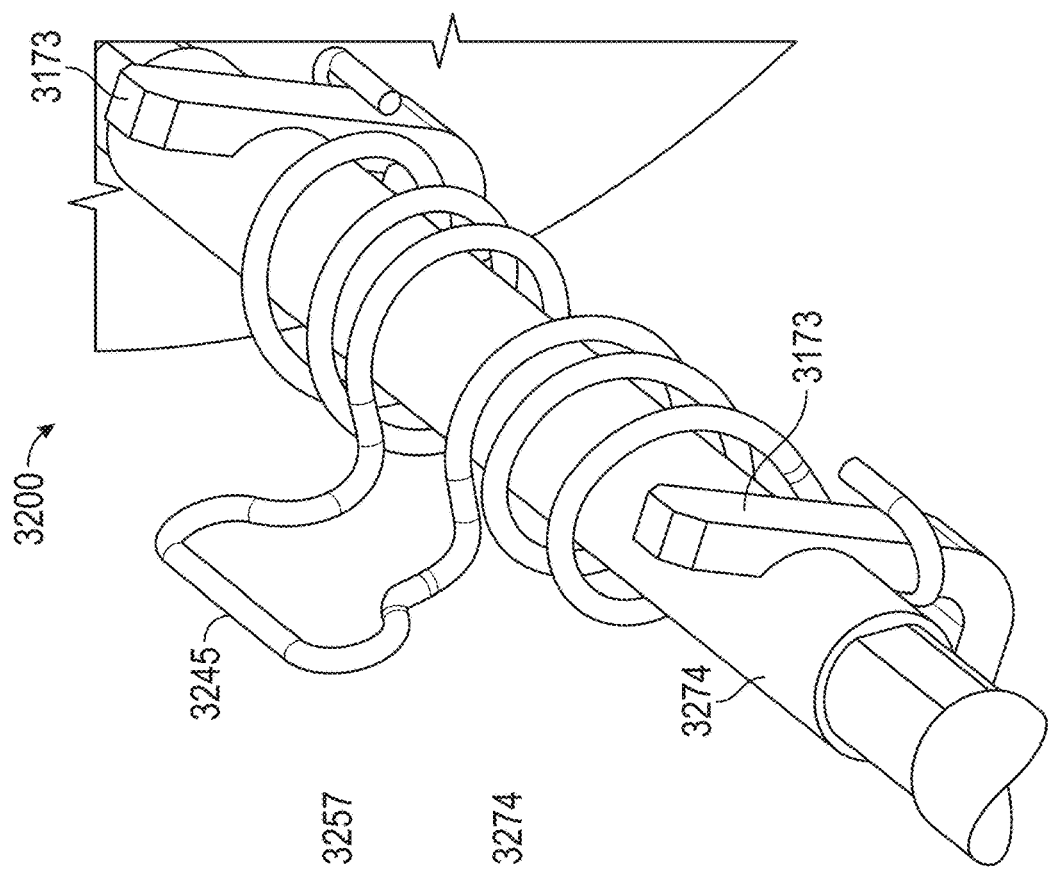
FIG. 32A/B show a spring in conjunction with a scraper and hanger bar on an auger in accordance with certain teachings set forth herein.
Figure 32B:
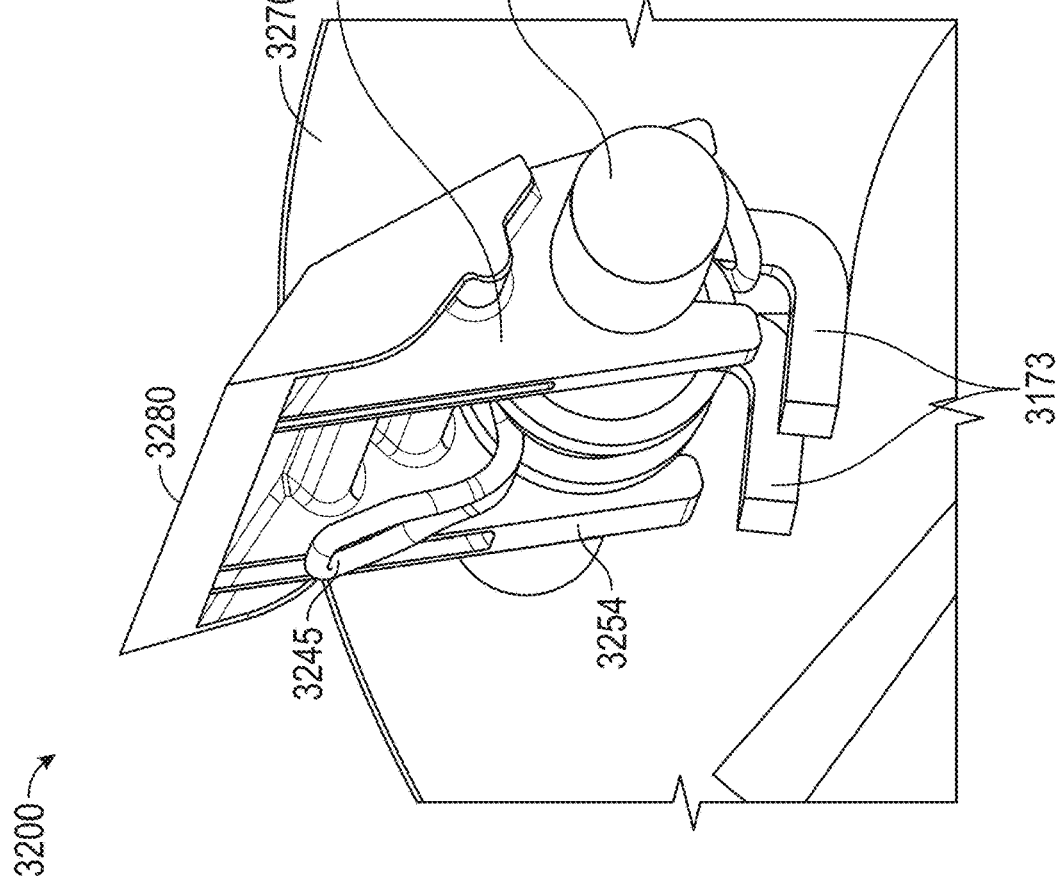

FIG. 32A shows an exemplary embodiment of an assembled beater 3200 with a dual-torsion spring 3245 and scraper 3280 in accordance with certain teachings set forth herein. Those skilled in the art may envision other embodiments without departing from the spirit of the inventions disclosed herein.

In a preferred embodiment, pump P-1 may be at a lower elevation than the dispenser 3. This will allow the product draining from the dispenser 3 to flow downwards to the pump P-1. This will work well if the dispenser 3 is located on a counter top, and the cleaning unit 1 is mounted below that counter; either permanently mounted, or on a platform for mobility, such as a cart. In another envisioned embodiment, pump P-1 may be of a type that can run "dry" for periods of time. That is to say that it can run without having a liquid coming into it. This may be, for example, a positive displacement pump, a pump with a magnetic drive, or any number of other pumps. Also, check valves may be used throughout the system to direct the water flows in the intended directions and may be used to keep the pump primed. While several check valves are shown in FIG. 1, those familiar with the art may envision the placement of check valves in other locations, and may also envision the use of other technologies to achieve the same purpose without departing from the spirit of the inventions disclosed herein.

In a preferred embodiment, all of the actions of opening and closing valves, monitoring the instrumentation, and actuating the equipment are to be done automatically. However, there is nothing to prevent the actions from being done manually, including effectuating the actions of the dispense valve of the dispenser 3. Any manual actions that need to be performed by a worker may be communicated to the worker from the system in any number of ways. In one embodiment, a human interface device may be associated with the cleaning unit 1, or with the dispenser 3, or both. In another embodiment, the actions may be relayed to a worker through a computer connected to a network, through an application being run on a mobile device such as a cell phone, tablet, or other device, or through any number of other ways. The information conveyed to a worker may include, but not limited to the action or actions to perform, the results of the actions such as success or failure, the time until the next action needs to be performed, the status of the system, and other information.

FIG. 1A/B depict both the cleaning unit 1 and the dispenser 3 as having controllers (labeled as "CPU" in each.) In one embodiment, the two controllers would share information and use that to coordinate the cleaning process. As an example, the controller in the cleaning unit 1 would signal to the controller in the dispenser 3 that valves YV-7, YV-3 and YV-4 were opened and that pump P-1 was activated for the rinse activity of Steps 1 through 9 of FIG. 2. These steps represent flushing the system with water three times to completely remove any product in the dispenser. The controller in the dispenser 3 would use that information to open valve YV-1 and activate motor M-1. In an alternate embodiment, the controller in the cleaning unit 1 may take direct control of the valves, instrumentation, and equipment in the dispenser 3 and control the entire process.

In yet another envisioned embodiment, the controller in the dispenser 3 would have full control over the valves, instrumentation, and equipment in the cleaning unit 1 and would control the entire cleaning process. In this embodiment, the controller for the dispenser may be programmed for the specific sequence and characteristics for that type and model of dispenser. As an example, a dispenser of a particular type and model would be given a specific sequence and characteristics for a daily cleaning process. On the other hand, a dispenser of the same type, but having a larger freezing chamber would be given the same sequence but different characteristics for the daily cleaning process, such as the amount of time needed for rinsing. In this way, each dispenser would have the information needed to clean itself properly. In yet another embodiment, the cleaning unit 1 may be given all of the information of sequences and characteristics for all models and types of dispensers, and the dispenser would identify itself to the cleaning unit 1 when it is connected, thus allowing the cleaning unit to make all of the decisions on steps and actions when it cleans the dispenser.

Figure 4:
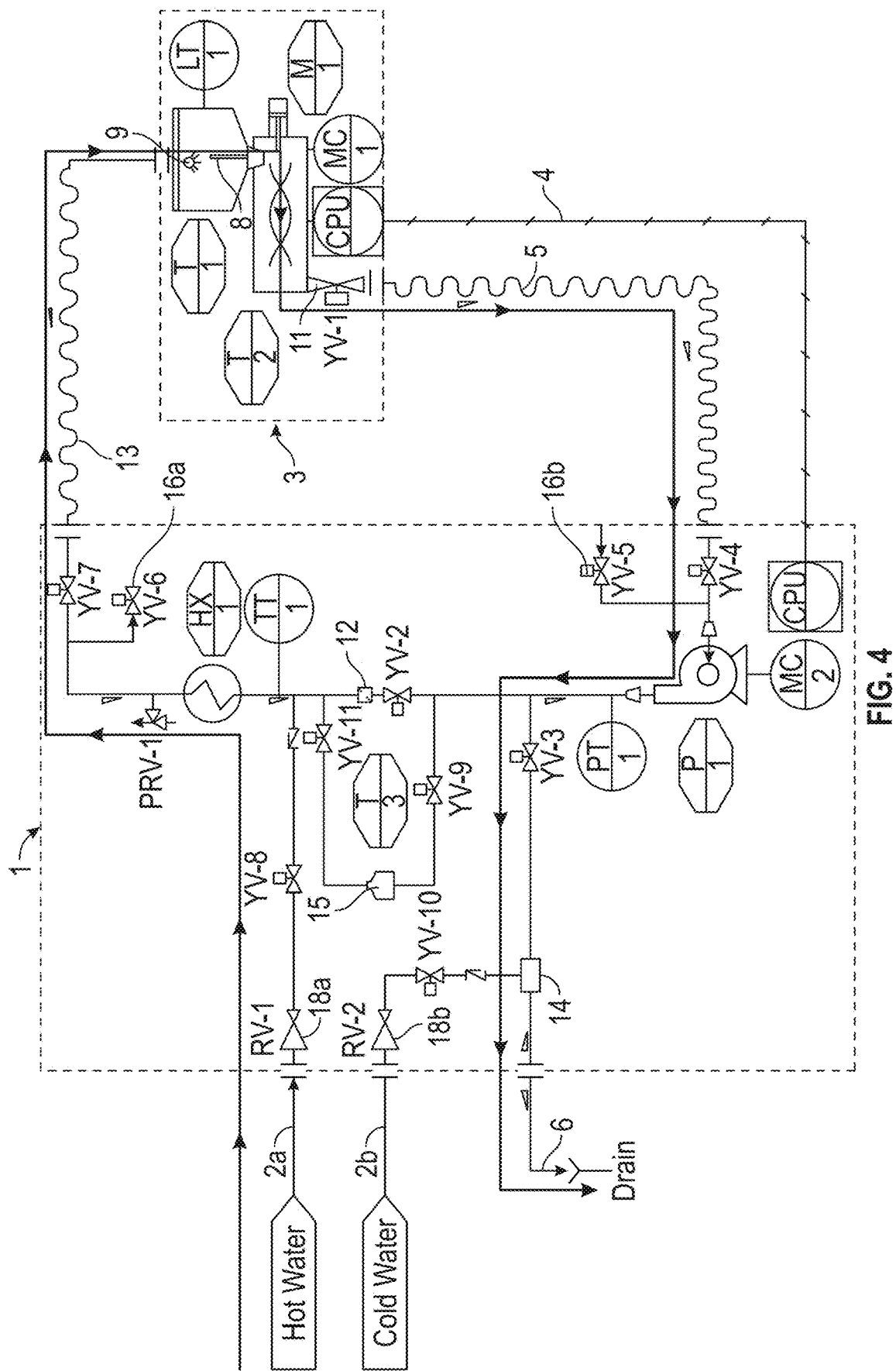
Figure 6:
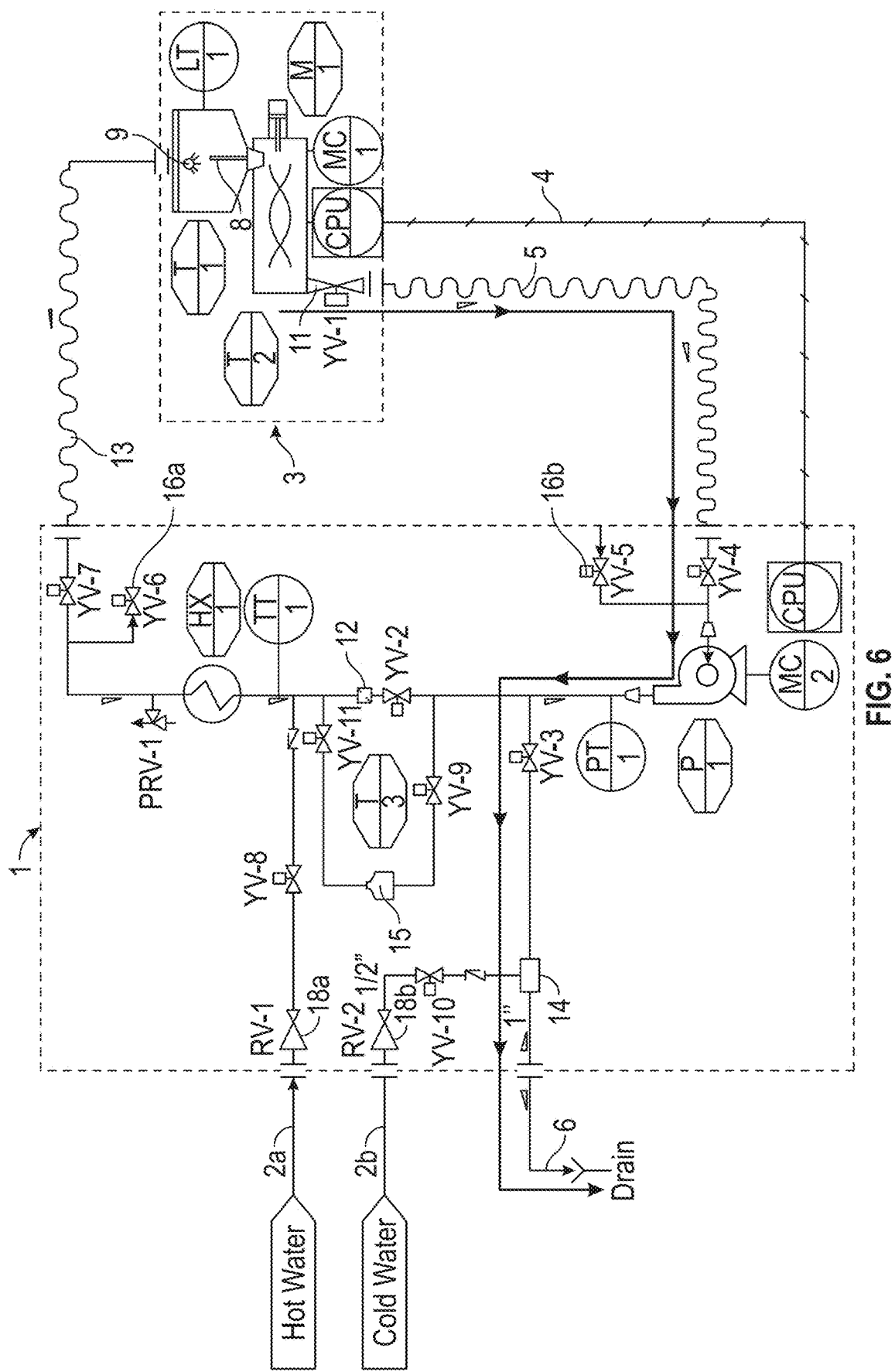

The steps that require the dispenser to be filled with water in FIG. 2 and rinsed and drained are illustrated in FIGS. 3, 4, and 6.

In the exemplary embodiment, filling the system with water is accomplished by keeping valves YV-1, YV-3, YV4, and YV-7 open and monitoring the level indicator LT-1 in the dispenser 3. Pump P-1 is not active at this time and may obstruct the flow of water thereby retaining at least some of it in the system. Since pump P-1 is situated at an elevation below the dispenser 3, pulsing the dispense valve YV-1 of the dispenser 3 has been found to prevent an air lock between the barrel and hopper. This pulsing action has also been found to more completely fill the system with water. If a positive displacement pump, or other suitable pump known to those familiar with the art is used, valve YV-1 may stay open and the pump may be pulsed. The system may continue to fill with water until the level transmitter LT-1 indicates that the hopper is sufficiently filled. When this happens, valve YV-6 may be closed thereby stopping the flow of water into the system.

Valve YV-3 may be closed during Step 2 in FIG. 2. However, leaving it open may allow the water with any remaining product in the piping after the pump P-1 to drain out of the system. This may be aided by configuring the piping throughout the system to adhere to slope requirements that facilitate the draining of fluids downwards towards the drain 6.

While the steps in the exemplary process listed in FIG. 2 may not fully show it, throughout these steps various sensors may be monitored to oversee that the operation is performing as expected. As one of many possible examples of this behavior, at this step of filling the system with water, pressure sensor PT-1 may be monitored to determine that the pressure in the line after pump P-1 is reducing to atmospheric pressure as the water drains from the system at that point. If the pressure sensor PT-1 is measuring anything other than draining, the controller or controllers may be programmed to see that as a fault in the system, and may then stop the system and inform a worker of the detected problem. Those familiar with the art will be able to envision many other safety checks that may be autonomously performed by the system during each step of cleaning, which will not depart from the spirit of the inventions disclosed herein.

Similarly, unmonitored safety checks may be deployed in this system. One example is a pressure relief valve PRV-1 in-line after the heat exchanger HX-1. Some dispensers have their own pressure relief valves and other safety mechanism. It may be desirable to set the pressure relief set-point of the cleaning unit 1 to a pressure set-point lower than those on the dispenser 3. In this way, if a problem is encountered, the safety features of the cleaning unit 1 may deploy rather than those of the dispenser 3. If this happens, the dispenser will be able to go back into operation without resetting the safety features on it, which may be difficult to access or difficult to reset. Other suitable safety and relief valves may be deployed as needed without departing from the spirit of the inventions disclosed and taught herein.

Another method of heating the cleaning fluids in the dispenser 3 may be to use the refrigeration system. Running the refrigeration system coolant in a direction reversed from its normal cooling direction may be used to add heat to the coils surrounding the freezing chamber. This may be desirable to rapidly heat the cleaning fluids as they move through the dispenser 3, or to maintain a desired temperature of the cleaning fluids when the fluids are not moving through the system. For the latter, this may be when the freezing chamber is filled with cleaning fluids and the beater bar is activated to churn the fluids. Similarly, dispensers with a cooling coil around their hoppers may be utilized in this same way. In some situations, it may also be desirable to defrost any product remaining in the freezing chamber prior to flushing the system. Applicants have found that running the refrigeration system in reverse may produce these results.

Figure 5:
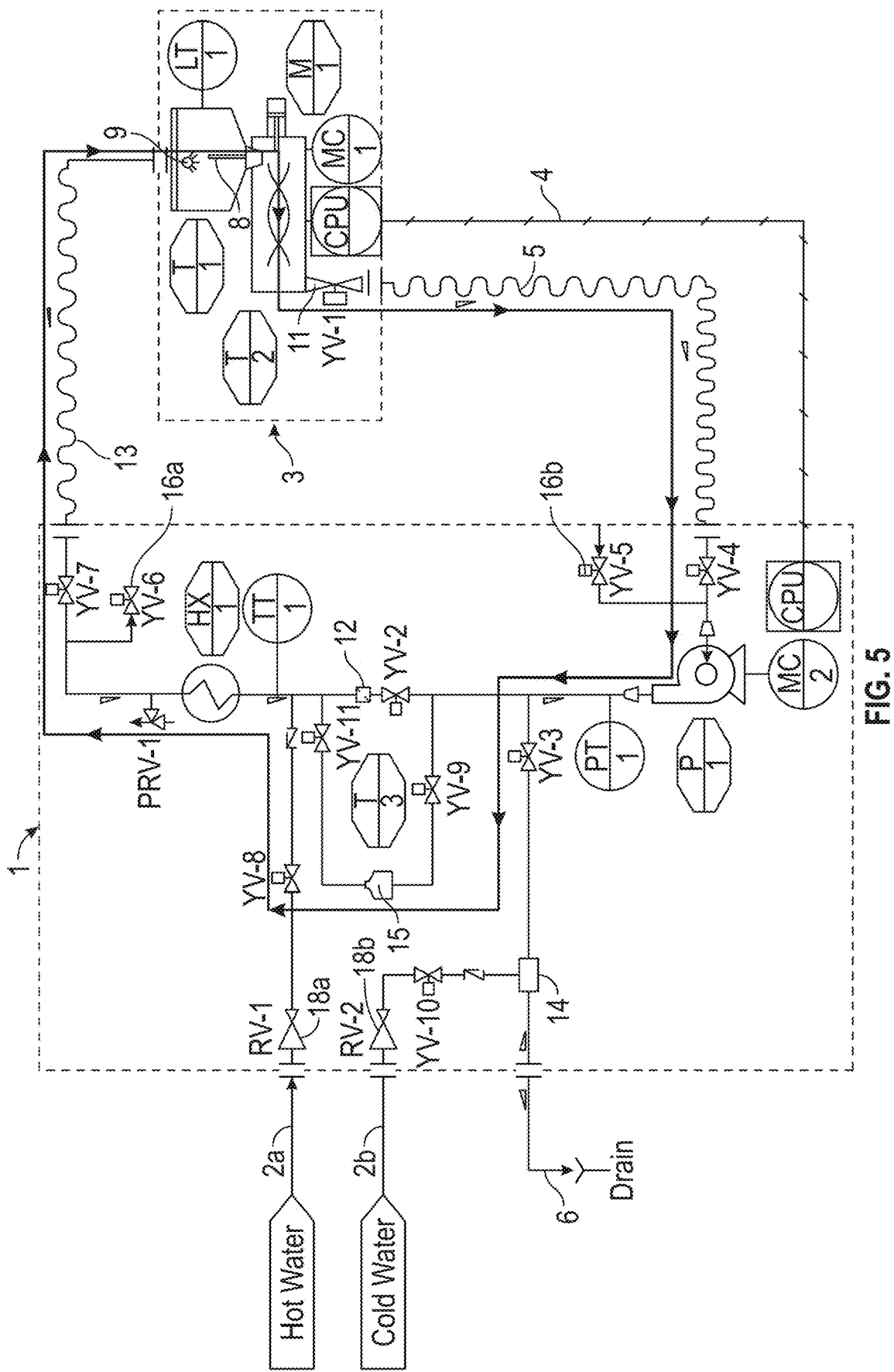

Steps 10 through 14 in FIG. 2 for this exemplary embodiment relate to cleaning the dispenser 3. In these steps, the water in the system may be heated and recirculated through the system, and a detergent, sanitizer, and/or other agent may be added. The flow of water for these steps is illustrated in FIGS. 5 and 6.

Applicants have found satisfactory results in maintaining a temperature of about 140° F. (60° C.) to 145° F. (63° C.) for a cleaning cycle as described in FIG. 2. Further satisfactory results have been obtained with temperatures up to around 170° F. to 175° F. Microbiological testing of the interior surfaces of a dispenser after such a cleaning has shown results that meet some regulations concerning the cleaning of a food dispenser. In some situations, owners or operators of food dispensers may desire to perform a cleaning using longer durations and/or higher temperatures so they may exceed the requirements, or so they may meet higher standards. Some may desire to perform these higher-standard cleanings periodically such as on a weekly, monthly, or quarterly basis. Changing the parameters shown in FIG. 2 may be used to accomplish this.

In a preferred embodiment, the cleaning agent may be within a container that is attachable to the dispenser 3 in-line with the water flow. This insert for a cleaning/sanitizing tablet 17 may be seen in exemplary FIG. 1. This may have some similarities to the nozzle cap described in U.S. Pat. Nos. 9,173,521 and 9,457,386, the contents of which are hereby incorporated by reference. In one envisioned embodiment, a component may be made that may be attached to the dispense nozzle of the dispenser 3 such that a cleaning agent is retained behind a seal that will dissolve when in contact with water. In another envisioned embodiment, the detergent or other cleaning agent may be contained in an enclosure that will dissolve when in contact with water. In one of many embodiments, the seal or film retaining the cleaning agent may be one that will only dissolve in hot water but not cold water. This may allow the initial flushing of the system with cold water so that the cleaning agent will not be dispensed, but a subsequent filling with hot water will dispense the cleaning agent. In another embodiment, the seal or film may dissolve after a known time after contacting water of any temperature. If this time is known, then the cycles of rinsing and filling may be timed to make use of the cleaning agent at a desirable time in the cleaning cycle.

In another embodiment, the detergent may be held within the second unit and metered out per cleaning. Uncareful workers might not always check that detergent had been used in the process. However, in some regulations there may be a requirement to provide assurance that it has been used. In an envisioned embodiment, a bin or container may be integrated into the cleaning unit 1 that may be filled with liquid or dry cleaning agents such as a detergent. A mechanism may be integrated with that such that a desired amount of the cleaning agent be metered out at an appropriate time during the cleaning cycle. Sensors may be deployed to sense when the bin or container is empty, or is not dispensing properly. In some situations, the bin or container may be filled with specific doses of cleaning agents each of which are self contained such as in a packet. In other cases, the bin or container may be filled with bulk material which is metered out on a weight basis.

Similar to adding detergent through an insert 17, a container 15 may be utilized to introduce cleaning solution to the system. The flow of fluids may bypass this by keeping valve YV-2 open during filling, rinsing, and draining. However, valve YV-2 may be closed and valves YV-9 and YV-11 opened when temperature sensor T-3 detects that the water is at an appropriate temperature for the introduction of the cleaning solution. Applicants envision that multiple containers 15 may be deployed, each containing different fluids that aid in cleaning and sanitizing a dispenser, and that each may be activated at different times and under different conditions. For example, a buffer solution may be deployed if sensors find that the pH is such that it may damage or otherwise impair parts of the dispenser.

In some situations, it may be desirable that the controller lock-out the dispenser if all of the cleaning steps have not been followed, or if some step (such as the addition of the detergent or sanitizer) was missed. An alert may be presented to an operator through the display panel, along with suggestions for corrective actions.

Those familiar with the art may envision other means for activating a cleaning agent within the system. These means may include mechanically operated containers or by manually adding a cleaning agent, or any number of other means.

The packet of cleaning agent may be placed in a specific receptacle in the cleaning unit 1, such as in the insert for a cleaning/sanitizing tablet 17. In another embodiment, the cleaning agent may be placed in a receptacle in the dispenser 3, or even in the hopper of the dispenser 3. Those familiar with the art may envision other locations for the inclusion of a cleaning agent without departing from the spirit of the inventions disclosed and taught herein. If the cleaning agent is an alkali detergent that will change the pH of the water, then a pH meter may be deployed in the system to monitor that the cleaning agent is deployed at a desired time in the wash cycle. Other sensors that measure characteristics of other cleaning agents may be utilized in a similar manger.

In the exemplary embodiment of Steps 10 through 14 of FIG. 2, the water retained in the system may be heated and recirculated through the system at appropriate times. In this, valve YV-1 in the dispenser 3 and valve YV-2 in the cleaning unit 1 may be opened while pump P-1 drives the water. During this step, heat exchanger HX-1 may be activated as well as the motor M-1 for the auger or beater bar in dispenser 3. A desired temperature may be attained and held by monitoring the temperature sensor TT-1 in the cleaning unit 3. Additional temperature sensors may be utilized in the hopper, such as temperature sensor T-1, which would monitor the temperature of the hopper, temperature sensor T-2, which would monitor the temperature in the freezing barrel, and T-3, which would monitor the temperature as the fluids return to the cleaning unit 1. Applicants have found that a temperature of 140° F. (60° C.) provides desirable results for a recirculation time of 16 minutes. The recirculation time and temperature may be adjusted to achieve other desirable characteristics. As may be seen in Steps 12 and 13 of FIG. 2, the heat exchanger may be activated for 1 minute to reach a desired temperature and then activated for an additional 15 minutes while the flow of the fluids passes through container 15, allowing cleaning fluids to contact all surfaces of dispenser 3. The use of the heat exchanger may not be needed if water of sufficient temperature is brought into the system from a hot water source.

Pump P-1 should not discharge enough water so that it escapes from the dispenser 3 around the lid. Therefore, it may be preferable for pump P-1 to have a variable drive motor. In one embodiment, pump P-1 may initially be run at as high a speed as possible, but then slowed if the level detector LT-1 registers that the fluid is above a certain level in the hopper. Slowing the pump for a time may allow for air to escape from the freezing chamber and drain hose 5 without stopping pump P-1.

A filter may be placed in the recirculation path. In the exemplary embodiment shown in FIG. 1, a gasket strainer 12 is in the flow path after valve YV-2. In an alternative embodiment, a filter or strainer may be placed in the flow path before the pump P-1 so any debris from the dispenser 3 will not damage the pump P-1. Pressure sensors such as PT-1 may be utilized to monitor that the filters or strainers do not become clogged. Those familiar with the art may envision the placement of other filters and strainers at other locations throughout the system without departing from the spirit of the inventions disclosed and taught herein.

In a preferred embodiment, as the water contacts the detergent insert 17, the seal retaining the detergent or other cleaning agent may be dissolved and the cleaning agent released into the system. The action of recirculating the water through the system along with running the motor M-1 for the auger or beater may promote that the cleaning agent reaches and cleans all areas inside the dispenser 3. The cleaning agent may be a powder, a solid, or a liquid, and may be an alkali detergent, an antimicrobial, or any number of other agents designed to properly clean the dispenser 3. A sanitizer may be incorporated into the cleaner, or may be added after a rinse. Alternatively, hot water may also be used to sanitize the system. In a similar way, a disinfectant such as hydrogen peroxide or other substances known to those familiar with the art may be used to disinfect the dispenser during the steps outlined and taught herein. Disinfectants may be sprayed into the system at appropriate places so they may contact surfaces. The use of hydrogen peroxide may be desirable in some situations because it quickly breaks down into oxygen and water, which may not need further flushing from the system.

In the exemplary embodiment of FIG. 2, the detergent contained in the insert for a cleaning/sanitizing tablet 17 may be activated and dispense some detergent at all times that water is running through the system. There may be sufficient quantity of detergent to continue to feed this detergent through all of the steps of 1 through 9. Alternatively, the film covering the detergent may be configured such that it won't release the detergent until after the three rinses of steps 1 through 9. Then, in Step 12, valve YV-2 is closed and valves YV-9 and YV-11 may be opened to allow the flow of the fluids through the container 15 for the addition of a detergent, a sanitizer, or both together. While container 15 is represented as a single container, it may actually be multiple containers that hold different substances that will only be mixed when fluids flow between valves YV-9 and YV-11.

In an envisioned embodiment, plasticizers, stabilizers, antioxidants, UV absorbents, or other additives in fluids that prolong the life of components having plastic surfaces may be flowed through the system. These additives may be flowed through the dispenser separately from, or in conjunction with the cleaning and rinsing fluids as described and taught herein. Similarly, fluids that have substances that prolong the life of, or prevent corrosion of, other materials used within the system may be flushed through the system periodically to further prolong the life of the dispenser without opening it.

After Steps 11 through 13 have been completed, the cleaning solution may be drained from the system as indicated in Step 14 as may be seen in FIG. 6. This may be accomplished in a manner similar to the initial draining of the system in Step 1 as shown in FIG. 1A/B. Valves YV-1, YV-3, and YV-4 may be opened as in Step 1, but here valve YV-12 may be opened to allow air into the system. While just allowing air to enter the system would suffice to allow the system to drain, applicants have found an embodiment of using an air compressor C-1 to drive the water out of the system as shown in FIG. 1B. Filters may be deployed before and after the air compressor C-1 to promote that only purified air, without any common air-borne contaminants, enters the system. In one embodiment, a 40 micron particle filter 7 may be used before the air compressor C-1, and a hydrophobic filter 10 having a particle prevention rating of less than or equal to 1 micron may be used after the air compressor C-1. Other arrangements may be utilized without departing from the spirit of the inventions disclosed and taught herein. One alternative embodiment would be to use a chemical drying agent or mechanical drying process in-line before or after the air compressor C-1 to remove moisture from the air or compressed gas.

Referring to FIG. 1A, applicants have achieved desirable results by placing an air inlet (not shown) into the lid of the hopper of dispenser 3. As described elsewhere, sensors may be used to prevent the level of fluids in the hopper from reaching to the top of the hopper. Other methods known to those skilled in the art may be used to keep the spray from the sprayer 9 from wetting the air inlet and the filter. The filters described for use in FIG. 1B may be used in this embodiment as filters for the air inlet in the lid of the hopper as well.

In the preferred embodiment of FIG. 1A, when the valves are opened to drain the system air may be allowed to enter the system from the air inlet in the hopper lid. This will allow for draining and pressure equalization.

The dispenser 3 may be drained by the pump P-1 and gravity. Although the dispenser 3 may not be entirely dried without the use of compressed air or another gas, the remaining liquid in the dispenser 3 may not present any problems since the residual liquids remaining will be bacteriostatic after sanitization. This has been found to be acceptable for short periods of time such as when the unit is to be cleaned and placed back into service just after cleaning, or placed back into service the following day.

One of many alternatives to using air and a compressor would be to use compressed gas from another source. Many dispensers already use food-grade carbon dioxide in compressed form to make frozen beverages. Since this may already be available at the location of the dispenser, another envisioned embodiment is to pipe that carbon dioxide into the system so it may be used within the systems and methods described herein. In some dispensers, nitrogen or other gases are used. In those cases, those gases may be used if the source is readily available.

In another envisioned embodiment, a check valve and an air filter may be used in place of an air compressor or other source of compressed gas. In this embodiment, air or other gases within the system would be allowed to vent while the system is being filled with water and/or cleaning solutions. During drain cycles, air would then enter the system through the air lock after passing through the filter. Establishing slope requirements throughout the system would promote that all liquids would drain from the system without the use of compressed air or another compressed gas. The check valve and air filter to be used in this envisioned embodiment may be located at any appropriate place in the system but it may be preferable to associate them with the lid or another part of the hopper as either a permanent fixture or associated with a fixture attached to the hopper used for cleaning the system as described previously.

One of many ways to detect when the cleaning solution has been drained from the system is by monitoring pressure monitor PT-1. This may be used to indicate a transition of the discharge from a liquid to a gas. Other sensors may be used to detect this transition as well.

In some cases, a cleaning solution may be rinsed out as the residue may be unwanted. In some other cases, a no-rinse cleaning agent or sanitizer may be used so rinsing may not be necessary. Step 5 of FIG. 2 of this exemplary embodiment depicts a scheme to rinse the system after the cleaning solution has been drained. In this exemplary embodiment, the valves, instrumentation, and equipment monitoring is substantially the same as the initial rinse of Steps 1 through 9 as depicted in FIG. 2.

In some situations, it may be desirable to run the heat exchanger HX-1 while flushing the system if the residue may be more easily removed with hot water than with cold. In some situations, it may be desirable to keep the entire system at an elevated temperature to facilitate drying after the final rinse.

In some situations, regulations may require that the discharge of fluids must be controlled. This may be desirable to prevent workers from being scalded from water that is too hot, or to prevent the discharge water from affecting the municipal drain system. Applicants have found ways to quench the heat in the process fluids within the dispenser prior to discharge. In one way, the refrigeration system surrounding the freezing barrel may be started while the hot water is flowing through it. Similarly, a refrigeration system associated with the hopper may be activated.

Figure 27:
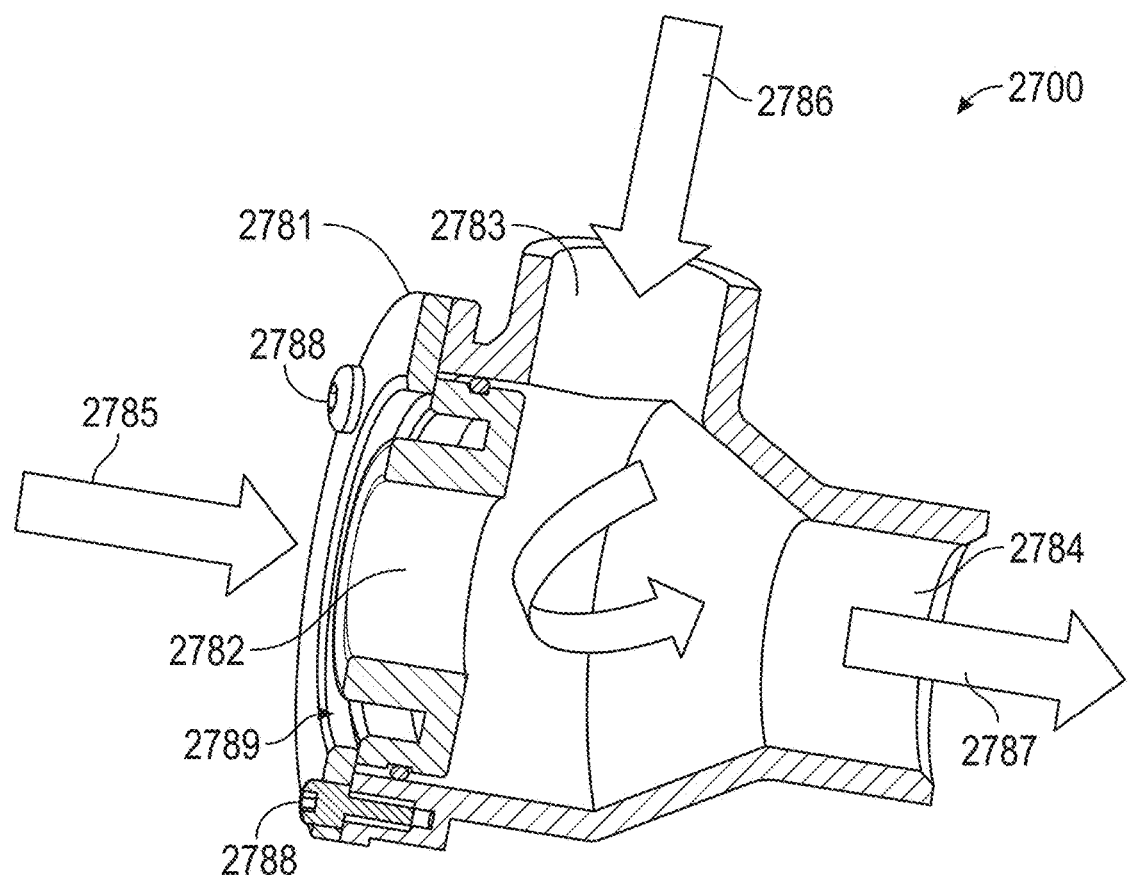
FIG. 27 is a cut-away view of a cooling chamber in accordance with certain teachings set forth herein.

Applicants have found a method for quenching the heat of discharged fluids prior to discharge in another way as well. This may be better understood by referring to FIGS. 1 and 27. In one embodiment, a multi-inlet cooling chamber 2781 in FIG. 27 may be inserted in the drain line. This cooling chamber 14 may be in-line after valve YV-3 in FIG. 1. Cooling chamber 2781 has a hot fluid inlet 2782, a cold fluid inlet 2783, and an outlet 2784. In operation, prior to, or simultaneously with opening valve YV-3 to discharge the hot cleaning fluids 2785, cold fluid 2786 may be directed to the cold fluid inlet 2783. The cold fluid 2786 may be diverted from the cold water source 2b, or from another source. The fluids mix in the cooling chamber 2781 and discharge a cooled fluid 2787 to the drain. As seen in FIG. 1, the cold water from water source 2b enters by going through valve YV-10 when valve YV-3 is opened.

The mixing chamber 2781 may be of a durable plastic or metal capable of withstanding expected temperatures and pressures. Check valves may be placed before the inlets to ensure that a higher pressure from one inlet does not back up into the other inlet.

Applicants have found that producing the mixing chamber 2781 with a detachable hot fluid inlet cover 2789 facilitates manufacturing and installation of the item into a cleaning unit 1. The hot fluid inlet cover 2789 may be attached to the cooling chamber 2781 with screws 2788 or by other means known to those of ordinary skill in the art.

Figure 28A:
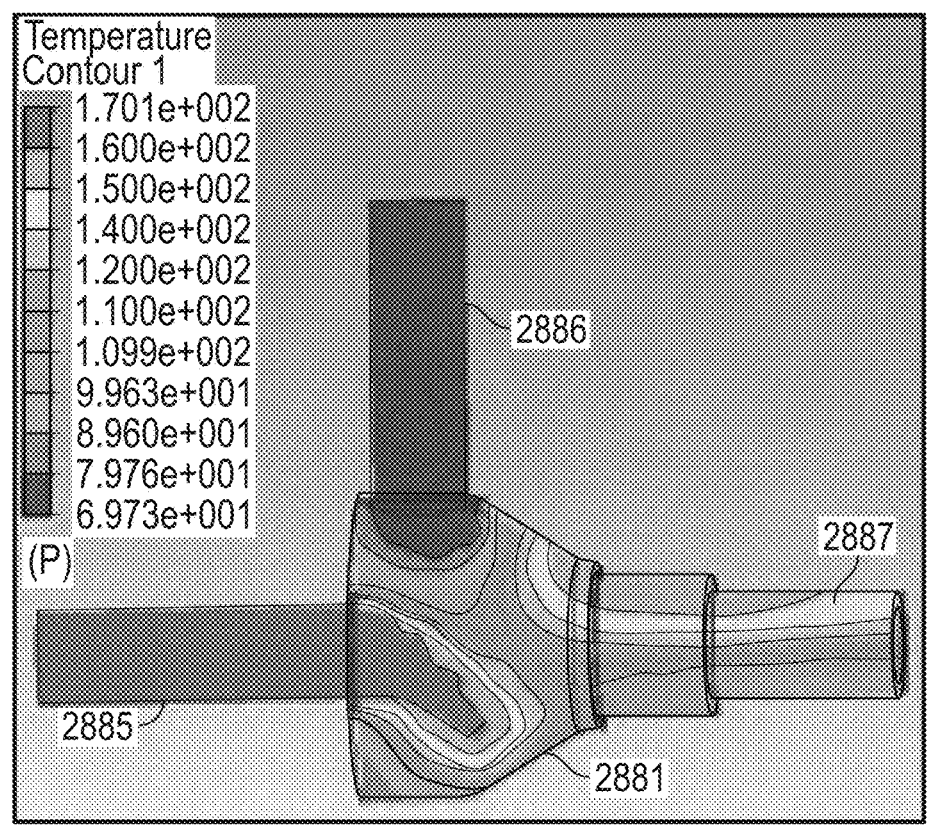
FIG. 28A/B are a Scraper Blade attached to a beater bar in accordance with certain teachings set forth herein.
Figure 28B:
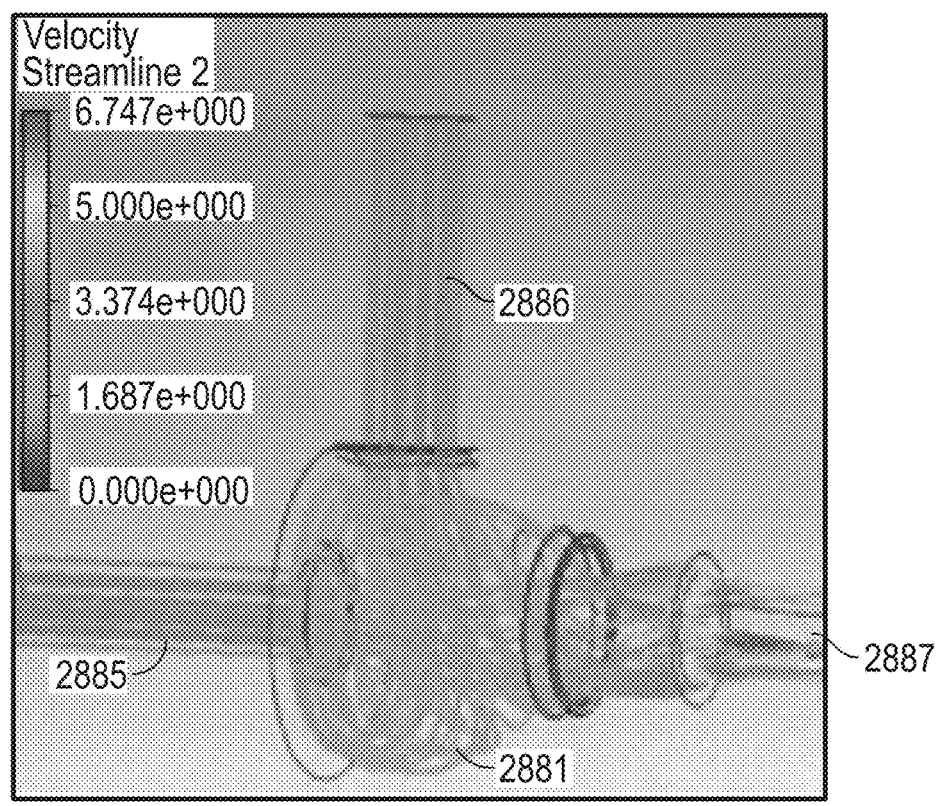

FIGS. 28A and 28B may be viewed to see how the cooling chamber 2881 operates. FIG. 28A shows the temperatures of the fluids entering and exiting the cooling chamber 2881. The cold fluid inlet 2783 and the hot fluid inlet 2782 have been sized to handle approximately 3.5 gallons per minute of flow. The hot cleaning fluids 2885 enter the cylindrical chamber from one end, and the cold fluid 2886 enters from an angle perpendicular to the axis of the cylinder. Furthermore, the cold fluid inlet 2783 may be offset from the long axis of the cylinder to promote a rotation within the cooling chamber 2781. Tapering the cylinder at an area after the location where the cold fluid inlet 2783 injects the cold fluid 2886 aids in the mixing as the fluids are drawn together as they move towards the outlet 2784. The outlet 2784 may be the same diameter as the inlets or may be of a larger size.

The inner surfaces of the cooling chamber 2781 may be smooth to ensure that food particles are not trapped by any exposures. However, they may be corrugated or otherwise manufactured to have projections or indentations to further mix the fluids.

This rotational mixing may be seen in FIG. 28B showing the velocity of the fluids as they mix and exit the cooling chamber 2881. FIG. 28A shows that the cooled fluid 2887 is at a temperature between that of the hot cleaning fluids 2885 and that of the cold fluid 2886 as it exits the cooling chamber 2781. FIG. 28B shows that the flow rates of the fluids entering the cooling chamber 2881 are about equal, but that the flow rate of the cooled fluid 2887 leaving the chamber 2881 is much greater.

Applicants envision that the diversion of the cold fluid into the mixing chamber be automated such that the hot cleaning fluids will not exit the appliance without their temperature being reduced. This may be further controlled by adding automated valves and temperature sensors.

In another envisioned embodiment, the cold water source 2b may be used in a heat exchanger of any type known to those skilled in the art to reduce the temperature of the hot cleaning fluids before they are drained.

The final rinse of Steps 10 through 14 may be used to deploy a no-rinse sanitizer if desired. In another envisioned embodiment, an air-born or gas sanitizer may be deployed after the system has been rinsed, drained, and dried.

The final step in this exemplary cleaning process is to drain the system. This may be seen as Step 14 of FIG. 2 and is shown in FIG. 6. The time for this step may be increased if it is desired to dry the system. This may be aided by utilizing the heat exchanger HX-1 to heat the incoming air. Forcing this air, or another gas through the system may dry the system, and may also facilitate pushing any remaining fluids out of the system. Similarly, it may be desirable to use a dry and inert gas in this last step. Leaving the system full of an inert gas, such as carbon dioxide or nitrogen already used with the dispenser 3, may lessen the likelihood of corrosion rather than leaving it filled with air, even for extended periods of time.

Applicants have found that the times for each step as listed in FIG. 2 are sufficient to adequately clean and sanitize a dairy or yogurt product dispenser. It may be noted by those familiar with frozen food and beverage dispensers that the total time for cleaning as listed in FIG. 2 is far lower than the time previously needed to clean a dispenser. In some cases, manually cleaning a dispenser has been known to take well over 4 hours. In another aspect of the advantages provided by the inventions disclosed herein, applicants have found that the amount of water needed for cleaning dispensers with the inventions disclosed herein is greatly decreased.

The times for cleaning other types of dispensers may be found by using the systems and methods disclosed herein on those dispensers. An alternative to timing each step is to analyze other inputs that may be available to the system. As an example, but without limitation, a sensor may be placed after valve YV-3 (leading to the drain 6) capable of sensing particulate matter in the discharge stream. It would be known that flushing the freezing chamber containing some product would suffuse the discharge with particulate matter until no dairy or yogurt products were left in the hopper or freezing chamber. Using that, the rinse of Steps 1 through 3 of FIG. 2 would continue as long as the sensor was reading particulate matter. Once no particulate matter was detected, or a sufficiently low amount, the controller would deem those steps to be completed. Those familiar with the art may envision other sensors to determine the progress of steps. Such sensors may include, but are not limited to: pH meters, turbidity indicators, flow meters, viscosity measuring devices, temperature sensing devices, and pressure measuring devices.

The exemplary steps for cleaning as illustrated in FIG. 2 may be used for cleaning at the end of the day. In this, the workers may attach the described attachments and initiate the cleaning steps described at the end of their workday. The process may run automatically and may shut itself off when finished. The following day, the machine will be cleaned and sanitized, and ready for operation when the next shift of workers arrives. It will be appreciated by those familiar with the art that the systems and methods disclosed herein do not require a worker to perform manual scrubbing, wiping, and complex disassembly of the dispenser 3. Also, properly cleaning and sanitizing a dispenser by utilizing the inventions disclosed and taught herein may keep a dispenser ready for operations for extended periods of time.

A preferred embodiment of the inventions disclosed herein is one in which at least one cleaning recipe is contained within the cleaning unit 1. One such recipe is the series of steps shown in FIG. 2. Other recipes may contain the steps of rinse, fill, circulate, and drain in that or different orders and for various times. For example, the recipe in FIG. 2 may be used for a daily cleaning and a recipe for a deep cleaning may have similar steps but the step of recirculation may last much longer, and have more rinses after recirculation. It is also envisioned that recipes may be entered through an interface to a network, a computer, or a memory storage device, and that a worker may enter the steps and times for a cleaning recipe manually.

Different cleaning recipes may be used for different situations. As an example, some dispensers may require that they be flushed out after some number of hours of operation. If this were to be done manually, this may take quite some time during which customers would not be able to attain their desired confection. In this case, a full cleaning as described in FIG. 2 may not be required, but the steps of rinsing and draining as described utilizing the inventions disclosed herein may suffice and may be done in a very few minutes.

The embodiment described above may be applied to dispensers that have more than one freezing barrel. In a simple and straightforward case, a single cleaning unit 1 would be attached to each hopper and dispense nozzle in turn for cleaning each one sequentially. An alternative embodiment would be to run a single feed hose 13 to each hopper and sprayer 9, and a single drain hose 5 from each dispense nozzle to a single cleaning unit 1, thus cleaning the units in parallel.

The exemplary embodiments of FIG. 1A/B show that valves YV-6 16*a* and YV-5 16*b* may be attached to another barrel of dispenser 3 or to another dispenser altogether (not shown). These valves 16*a* 16*b* may be regulated to flow water and cleaning fluids into the second barrel, or other dispenser, when water or cleaning fluids are not being flowed into the first unit. In this embodiment, container 15 may be large enough to contain several charges of solution without refilling it after each cycle of steps 1 through 14 in FIG. 2.

A further embodiment to clean multiple freezing barrels simultaneously may be to serialize the connections between dispensers. In this, the feed hose 13 from the cleaning unit 1 would attach to a first hopper lid with sprayer 9. A hose would then connect the dispense nozzle of the first unit to a hopper lid with sprayer 9 of a second unit. This would continue until the last unit where the drain hose 5 would connect to the dispense nozzle of the last unit, thus completing a circuit of the cleaning path. In each of these envisioned embodiments, adjustments may be made to the timing or other parameters of each step.

The embodiments described thus far have recounted the cleaning unit as a stand-alone system. However, there is nothing to prevent an embodiment of the inventions described herein to be built into, or otherwise integrated with a dispenser. Such an embodiment may utilize the resources of the dispenser in many advantageous ways.

The embodiments disclosed and taught herein may be used to greatly reduce the amount of time needed to clean and prepare a dispenser for use. In one aspect, this is achieved by automating several of the processes needed to clean, sanitize, and prepare a dispenser for operation. In another aspect, the amount of disassembly of the dispenser may be minimized or altogether eliminated. In another aspect, the labor needed to clean, sanitize, and prepare a dispenser for operation may be minimized.

The embodiments disclosed and taught herein may also be used to provide some assurance that the system has been properly cleaned, sanitized, and prepared for use. In one aspect, they may be done by monitoring sensors to report that proper procedures including appropriate times and temperatures have been achieved during the process. Similarly, sensors may monitor the properties of the cleaning fluids to report that detergents, disinfectants, sanitizers, and other appropriate solutions have been utilized properly in the process.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A self-cleaning frozen food product dispenser comprising:
   a main dispenser body;
   an ingredient hopper positioned within the dispenser body, the ingredient hopper defining an upper opening through which an ingredient can be poured into the hopper;
   a hopper lid coupled to the main dispenser body through a hinge assembly such that the hopper lid can be moved between an open position permitting the pouring of an ingredient into the ingredient hopper and a closed position in which the hopper lid is positioned over the hopper opening;
   a sprayer coupled to the hopper lid such that the sprayer can spray fluid into the hopper, the sprayer having a sprayer inlet;
   a latch mechanism for latching the hopper lid to the main dispenser body when the hopper lid is in the closed position, the latch mechanism including a latch and a latch sensor adapted to provide an indication when the hopper lid is in the closed position;
   a freezing chamber in fluid communication with the ingredient hopper;
   a beater bar positioned within the freezing chamber;
   a bi-directional motor coupled to the beater bar and adapted to cause rotation of the beater bar when activated;
   a faceplate, the faceplate defining a discharge nozzle;
   a dispense valve that can be actuated to dispense material from the freezing chamber through the discharge nozzle;
   a cleaning connector, the cleaning connector including an inlet and an outlet, the inlet to the cleaning connector being removably couplable to the discharge nozzle, wherein the cleaning connector includes a cleaning connector sensor that is activated and provides a second indication when the cleaning connector is positioned relative to the faceplate for a cleaning operation;
   a pump having a pump inlet and a pump outlet, the pump inlet being fluidly coupled to a source of cleaning solution, and the pump outlet being fluidly coupled to the sprayer inlet;
   a controller including control inputs coupled to receive the indication from the latch sensor and the second indication from the cleaning connector sensor, and further controls outputs coupled to control operation of the bi-directional motor, the dispense valve, and the pump, the controller being configured to:

(a) display an error message if:
  the cleaning connector sensor does not indicate that the cleaning connector is attached to the faceplate for a cleaning operation;
and
(b) enable the performance of a cleaning operation wherein, during at least portions of the cleaning operation,
  the pump is activated to pump cleaning fluid to the sprayer inlet;
  the motor is activated to drive the beater bar in a clockwise direction; and
  the dispense valve is cycled between an actuated and a non-actuated state.

2. The dispenser of claim 1, wherein the controller is further configured, during at least portions of the cleaning operation, to: activate the motor to drive the beater bar in a counterclockwise direction.

3. The dispenser of claim 1, wherein: (a) the dispenser further comprises a hopper level sensor for detecting whether the level of material in the ingredient hopper is above a predetermined level; (b) the controller includes an input coupled to the hopper level sensor; and (c) during a cleaning operation, the controller is configured to take an action to lower the amount of fluid in the hopper if the level of material in the ingredient hopper exceeds the predetermined level.

4. The dispenser of claim 1, wherein the cleaning connector includes a ball check valve.

5. The dispenser of claim 3, wherein freezing chamber includes a drain and the action to lower the amount of fluid in the hopper includes one of: (a) stopping the flow of fluid to the sprayer; (b) opening the freezing chamber drain; (c) activating the beater motor to push air out of the freezing chamber.

6. The dispenser of claim 3, wherein pump includes a variable drive motor and the action to lower the amount of fluid in the hopper comprises slowing the pump.

* * * * *